(12) United States Patent
Zhong

(10) Patent No.: US 11,814,784 B2
(45) Date of Patent: Nov. 14, 2023

(54) CLOSED POROUS COMPOSITE MATERIAL, THERMAL INSULATION MATERIAL, SOUND INSULATION MATERIAL, AND MANUFACTURING METHOD THEREOF

(71) Applicant: Jinbang Zhong, Fujian (CN)

(72) Inventor: Jinbang Zhong, Fujian (CN)

( * ) Notice: Subject to any disclaimer, the term of this patent is extended or adjusted under 35 U.S.C. 154(b) by 245 days.

(21) Appl. No.: 17/264,596

(22) PCT Filed: Sep. 9, 2019

(86) PCT No.: PCT/CN2019/104980
§ 371 (c)(1),
(2) Date: Jan. 29, 2021

(87) PCT Pub. No.: WO2020/052524
PCT Pub. Date: Mar. 19, 2020

(65) Prior Publication Data
US 2021/0292964 A1  Sep. 23, 2021

(30) Foreign Application Priority Data

Sep. 10, 2018 (CN) .......................... 201811051379.3

(51) Int. Cl.
*D06N 3/00* (2006.01)
*A41D 31/06* (2019.01)
(Continued)

(52) U.S. Cl.
CPC ......... *D06N 3/0059* (2013.01); *A41D 31/065* (2019.02); *C08J 9/0061* (2013.01); *C08J 9/32* (2013.01); *D06N 3/0068* (2013.01); *D06N 3/0088* (2013.01); *D06N 3/042* (2013.01); *D06N 3/14* (2013.01); *C08J 2203/22* (2013.01);
(Continued)

(58) Field of Classification Search
None
See application file for complete search history.

(56) References Cited

U.S. PATENT DOCUMENTS

| | | | |
|---|---|---|---|
| 9,738,788 B1* | 8/2017 | Gross | C23C 18/1635 |
| 2005/0003131 A1* | 1/2005 | Ishikawa | B32B 7/12 |
| | | | 428/40.1 |
| 2017/0328073 A1* | 11/2017 | Saladino | C08J 9/36 |

FOREIGN PATENT DOCUMENTS

| | | |
|---|---|---|
| CN | 1354085 A | 6/2002 |
| CN | 106591504 A | 4/2017 |

(Continued)

*Primary Examiner* — Jeffrey D Washville
(74) *Attorney, Agent, or Firm* — NKL Law; Allen Xue

(57) ABSTRACT

A method for manufacturing a closed porous composite material includes 1) preparing a mixture that has 30 to 70 parts by weight of water-dispersed resin, 10 to 300 parts by weight of unexpanded thermal expansion microspheres, and 100 to 550 parts by weight of water, and stirring the mixture thoroughly; 2) preparing a carrier; 3) coating the carrier with the mixture acquired in step 1; 4) heating the carrier so that the unexpanded thermal expansion microspheres expand; and 5) repeating steps 3 and 4 multiple times to acquire a closed porous composite material. The closed porous composite material has a large number of closed cavities and polymer walls separating the closed cavities. The closed cavity is 20 μm to 800 μm in size. The ratio of a total volume of the closed cavities to a total volume of the polymer walls is greater than 16.

10 Claims, 14 Drawing Sheets

(51) Int. Cl.
  *D06N 3/04* (2006.01)
  *D06N 3/14* (2006.01)
  *C08J 9/00* (2006.01)
  *C08J 9/32* (2006.01)

(52) U.S. Cl.
  CPC .... *C08J 2205/044* (2013.01); *C08J 2205/052* (2013.01); *C08J 2375/04* (2013.01); *C08J 2475/04* (2013.01); *D06N 2209/025* (2013.01); *D06N 2209/065* (2013.01); *D06N 2211/063* (2013.01); *D06N 2211/106* (2013.01); *D06N 2211/28* (2013.01); *D10B 2321/08* (2013.01); *D10B 2331/10* (2013.01); *D10B 2401/041* (2013.01); *D10B 2501/043* (2013.01)

(56) References Cited

FOREIGN PATENT DOCUMENTS

| | | |
|---|---|---|
| CN | 106671634 A | 5/2017 |
| CN | 106801111 A | 6/2017 |
| CN | 107401060 A | 11/2017 |
| CN | 109137537 A | 1/2019 |

* cited by examiner

CLOSED POROUS COMPOSITE MATERIAL, THERMAL INSULATION MATERIAL, SOUND INSULATION MATERIAL, AND MANUFACTURING METHOD THEREOF

TECHNICAL FIELD

The present disclosure relates to closed porous composite material, thermal insulation material, soundproof material and manufacturing method thereof.

BACKGROUND ART

"Food, clothing, housing and transportation" is a matter of primary importance that human civilization has to face and solve since its birth. The problem keeping out of cold in winter has been puzzling people except in the tropics and Greece. With the development of technology, human beings have learned to use animal fur, cotton, down and other materials to make clothing that can withstand the cold, and with the above existing clothing, people are able to stay outside for a long time even in cold winter. However, the above existing clothing are all thick and heavy. On the one hand, heavy clothing hinders free movements of the body, on the other hand they can't meet people's aesthetic requirements. The latter disadvantage is particularly prominent for the ladies who want to show their beautiful curves in cold winter. Imagine this exciting scene: if "the innovative thermal insulation material" is widely used to make winter clothing, when travelling in the frigid zone covered with snow, men can walk around in vogue jacket while ladies can put on pretty dress made of "the innovative heat insulation material".

SUMMARY OF THE DISCLOSURE

An embodiment of the present invention provides a manufacturing method of a closed porous composite material, wherein the method comprises:
1) preparing a mixture, the mixture comprises 30-70 parts by weight of water dispersing resin, 10-300 parts by weight of unexpanded thermo-expandable microspheres, 100-550 parts by weight of water, and stirring the mixture;
2) preparing a carrier;
3) coating a layer of the mixture obtained in step 1) on the carrier;
4) heating the layer of the mixture and the carrier for a certain time, in which the unexpanded thermo-expandable microspheres expand;
5) repeating steps 3) to 4) several times to obtain the closed porous composite material comprising multilayer of the mixture.

According to an embodiment of the present invention, for example, the mixture of step 1) comprises 40-60 parts by weight of water dispersing resin, 10-50 parts by weight of unexpanded thermo-expandable microspheres, 80-350 parts by weight of water.

According to an embodiment of the present invention, for example, the mixture of step 1) comprises 45-55 parts by weight of water dispersing resin, 10-30 parts by weight of unexpanded thermo-expandable microspheres, 100-250 parts by weight of water.

According to an embodiment of the present invention, for example, the unexpanded thermo-expandable microspheres are hollow spherical or quasi spherical, with an outer diameter from 10 μm to 40 μm and a wall thickness from 1 μm to 10 μm, the walls comprise thermoplastic or thermosetting polymer materials.

According to an embodiment of the present invention, for example, the water dispersing resin comprises two kinds of different water-based polyurethane dispersion, one weights 1-25 parts and the other one weights 49-25 parts.

According to an embodiment of the present invention, for example, the two kinds of different water-based polyurethane dispersion are first anionic aliphatic polyester polyurethane dispersion and second anionic aliphatic polyester polyurethane dispersion, respectively, the first anionic aliphatic polyester polyurethane dispersion weights 10-20 parts, preferably 15 parts; the second anionic aliphatic polyester polyurethane dispersion weights 40-30 parts, preferably 35 parts.

According to an embodiment of the present invention, for example, the mixture of step 1) further comprises at least one of defoamer 0-1 parts by weight, curing agent 0-10 parts by weight, thickener 0-10 parts by weight, mildew inhibitor 0-5 parts by weight, wetting leveling agent 0-2 parts by weight, hand feeling modifier 0-5 parts by weight, water-based pigment 0-20 parts by weight;
 preferably, the mixture of step 1) further comprises at least one of defoamer 0.1-1 parts by weight, curing agent 0.1-10 parts by weight, thickener 0.1-10 parts by weight, mildew inhibitor 0.1-5 parts by weight, wetting leveling agent 0.1-2 parts by weight, hand feeling modifier 0.1-5 parts by weight, water-based pigment 0.1-20 parts by weight.

According to an embodiment of the present invention, for example, in step 4), the carrier is heated to 100° C.-180° C. for 10-300 seconds; preferably, the carrier is heated to 120° C.-160° C. for 60-120 seconds; preferably, the carrier is heated to 130° C.-150° C. for 60-90 seconds; preferably, the carrier is heated to 140° C.-150° C. for 60-80 seconds.

According to an embodiment of the present invention, for example, the water dispersing resin comprises at least one selected from the group consisting of water dispersing polyurethane resin, water dispersing acrylic resin, water dispersing polyurethane modified acrylic resin, butyl cyanide emulsion, chloroprene latex, and polyvinyl acetate latex.

According to an embodiment of the present invention, for example, the curing agent comprises at least one selected from the group consisting of polycarbodiimide, polyisocyanate, blocked polyisocyanate, aziridine and amino resin; the defoaming agent is organosilicon defoamer; the wetting leveling agent is organosilicon wetting leveling agent; the hand feeling agent comprises at least one selected from the group consisting of high molecular weight organosilicon compounds, wax powder, wax emulsion, fumed or precipitated silica and their dispersing liquid; the mildew inhibitor comprises organic or inorganic water dispersing mildew inhibitor; the thickener comprises at least one selected from the group consisting of polyurethane associative thickener, alkali swellable acrylic thickener, cellulose thickener and inorganic thickener.

According to an embodiment of the present invention, for example, the carrier comprises at least one selected from the group consisting of woven fabric, non-woven fabric, leather and soft film.

According to an embodiment of the present invention, for example, a ratio of size of expanded thermo-expandable microspheres in step 4) to size of the unexpanded thermo-expandable microspheres in step 1) is from 2 to 10.

According to an embodiment of the present invention, for example, the closed porous composite material comprises a plurality of closed cavities and polymer walls which separate the closed cavities from each other; a size range of the closed cavities is from 20 μm to 800 μm, preferably, the size range of the closed cavities is from 50 μm to 300 μm, preferably, the size range of the closed cavities is from 60 μm to 200 μm, further preferably, the size range of the closed cavities is from 80 μm to 120 μm; and a ratio of total volume of the closed cavities to total volume of the polymer walls is greater than 3; preferably, the ratio of total volume of the closed cavities to the total volume of the polymer walls is greater than 3.33; preferably, the ratio of total volume of the closed cavities to the total volume of the polymer walls is greater than 16; preferably, the ratio of total volume of the closed cavities to the total volume of the polymer walls is greater than 33; preferably, the ratio of total volume of the closed cavities to the total volume of the polymer walls is greater than 83; preferably, the ratio of total volume of the closed cavities to the total volume of the polymer walls is greater than 166; preferably, the ratio of total volume of the closed cavities to the total volume of the polymer walls is greater than 333; preferably, the ratio of total volume of the closed cavities to the total volume of the polymer walls is greater than 417; preferably, the ratio of total volume of the closed cavities to the total volume of the polymer walls is greater than 556; preferably, the ratio of total volume of the closed cavities to the total volume of the polymer walls is greater than 833; preferably, the ratio of total volume of the closed cavities to the total volume of the polymer walls is greater than 1667.

According to an embodiment of the present invention, for example, the closed porous composite material is a heat insulation material, the heat insulation material comprises a plurality of closed cavities and polymer walls which separate the closed cavities from each other, when a thickness of the heat insulation material is 1 mm, a clo value of the heat insulation material is ≥0.20, or ≥0.40, or ≥0.50, or ≥0.60, or ≥1.0, or ≥1.5.

According to an embodiment of the present invention, for example, the closed porous composite material is consisting of a plurality of closed cavities and polymer walls which separate the closed cavities from each other, a size range of the closed cavities is from 20 μm to 800 μm, preferably, the size range of the closed cavities is from 50 μm to 300 μm, preferably, the size range of the closed cavities is from 60 μm to 200 μm, further preferably, the size range of the closed cavities is from 80 μm to 120 μm; a density of the closed porous composite material is from 5 kg/m$^3$ to 300 kg/m$^3$, preferably, the density of the closed porous composite material is from 10 kg/m$^3$ to 200 kg/m$^3$, preferably, the density of the closed porous composite material is from 20 kg/m$^3$ to 150 kg/m$^3$, preferably, the density of the closed porous composite material is from 30 kg/m$^3$ to 100 kg/m$^3$, preferably, the density of the closed porous composite material is from 40 kg/m$^3$ to 90 kg/m$^3$, preferably, the density of the closed porous composite material is from 50 kg/m$^3$ to 80 kg/m$^3$, preferably, the density of the closed porous composite material is from 60 kg/m$^3$ to 80 kg/m$^3$.

An embodiment of the present invention provides a closed porous composite material, wherein, the closed porous composite material comprises a plurality of closed cavities and polymer walls which separate the closed cavities from each other; a size range of the closed cavities is from 20 μm to 800 μm, preferably, the size range of the closed cavities is from 50 μm to 300 μm, preferably, the size range of the closed cavities is from 60 μm to 200 μm, further preferably, the size range of the closed cavities is from 80 μm to 120 μm; and a ratio of total volume of the closed cavities to total volume of the polymer walls is greater than 3; preferably, the ratio of total volume of the closed cavities to the total volume of the polymer walls is greater than 3.33; preferably, the ratio of total volume of the closed cavities to total volume of the polymer walls is greater than 16; preferably, the ratio of total volume of the closed cavities to the total volume of the polymer walls is greater than 33; preferably, the ratio of total volume of the closed cavities to the total volume of the polymer walls is greater than 83; preferably, the ratio of total volume of the closed cavities to the total volume of the polymer walls is greater than 166; preferably, the ratio of total volume of the closed cavities to the total volume of the polymer walls is greater than 333; preferably, the ratio of total volume of the closed cavities to the total volume of the polymer walls is greater than 417; preferably, the ratio of total volume of the closed cavities to the total volume of the polymer walls is greater than 556; preferably, the ratio of total volume of the closed cavities to the total volume of the polymer walls is greater than 833; preferably, the ratio of total volume of the closed cavities to the total volume of the polymer walls is greater than 1667.

According to an embodiment of the present invention, for example, the closed porous composite material is consisting of a plurality of closed cavities and polymer walls which separate the closed cavities from each other.

According to an embodiment of the present invention, for example, the polymer walls comprise a thermoplastic or thermosetting polymer on an inner side toward the closed cavities, and the polymer walls comprise a water dispersing resin on an outer side toward the closed cavities.

According to an embodiment of the present invention, for example, a thickness of the polymer walls is from 0.02 μm to 2 μm; preferably, the thickness of the polymer walls is from 0.03 μm to 1.0 μm; preferably, the thickness of the polymer walls is from 0.04 μm to 0.8 μm; preferably, the thickness of the polymer walls is from 0.05 μm to 0.6 μm; preferably, the thickness of the polymer walls is from 0.1 μm to 0.5 μm.

According to an embodiment of the present invention, for example, a shape of the closed cavities comprises spherical, quasi spherical and irregular shapes.

According to an embodiment of the present invention, for example, the closed cavities are formed by expanding a diameter of the unexpanded thermo-expandable microspheres by 2-10 times.

According to an embodiment of the present invention, for example, the closed porous composite material is a heat insulation material, when a thickness of the heat insulation material is 0.2 mm-3.0 mm, a clo value of the heat insulation material is from 0.1 to 3.0.

According to an embodiment of the present invention, for example, the polymer walls comprise a three-layered structure, the three-layered structure comprises two outer layers and an intermediate layer sandwiched between the two outer layers, wherein materials of the two outer layers are the same, and materials of the two outer layers are different from the material of the intermediate layer sandwiched between the two outer layers.

According to an embodiment of the present invention, for example, the carrier comprises at least one selected from the group consisting of woven fabric, non-woven fabric, leather and soft film.

According to an embodiment of the present invention, for example, the closed porous composite material comprises a carrier and a thermal insulation layer attached to the carrier, a thickness of the carrier is from 0.1 mm to 5.0 mm, and a thickness of the thermal insulation layer is from 0.2 mm to 10 mm.

According to an embodiment of the present invention, for example, both surfaces of the carrier of the closed porous composite material are respectively attached with a thermal insulation layer, a thickness of the carrier is from 0.1 mm to 5.0 mm, and a thickness of any thermal insulation layer is from 0.2 mm to 10 mm.

According to an embodiment of the present invention, for example, the closed porous composite material comprises two outer carriers and the thermal insulation layer sandwiched between the two carriers; a thickness of any one of the two carriers is from 0.1 mm to 5.0 mm, a thickness of the thermal insulation layer is from 0.2 mm to 10 mm.

According to an embodiment of the present invention, for example, the closed porous composite material comprises one carrier and the thermal insulation layer attached to the carrier, the thermal insulation layer has a multilayer structure comprising more than two layers; preferably, the layer in direct contact with the carrier in the thermal insulation layer is called base thermal insulation layer, the layer which is farthest from the carrier is called top thermal insulation layer, the layer(s) between the base layer and the top layer is(are) called intermediate thermal insulation layer(s), a content of the thermo-expandable microspheres in the base layer is greater than a content of the thermo-expandable microspheres in the top layer and in the intermediate layer.

According to an embodiment of the present invention, for example, the base thermal insulation layer comprises one kind of water dispersing resin, and the top thermal insulation layer comprises at least two different kinds of water dispersing resin.

According to an embodiment of the present invention, for example, the unexpanded thermo-expandable microspheres in different thermal insulation layers may be same or different.

According to an embodiment of the present invention, for example, a plurality of the closed porous composite materials are glued together to form an integrated whole through adhesives, or one or more of the closed porous composite materials are glued together with other materials through adhesives, and an amount of the adhesive required for a single gluing is from 10 $g/m^2$ to 25 $g/m^2$; preferably, the adhesive is at least one selected from the group consisting of PUR moisture reactive adhesive, hot melt adhesive, water dispersing adhesive and solvent adhesive.

An embodiment of the present invention provides a thermal insulation material, the thermal insulation material comprises a plurality of closed cavities and polymer walls which separate the closed cavities from each other, when a thickness of the thermal insulation material is 1 mm, a clo value of the thermal insulation material is ≥0.20, or ≥0.40, or ≥0.50, or ≥0.60, or ≥1.0, or ≥1.5.

According to an embodiment of the present invention, for example, the thermal insulation material is consisting of a plurality of closed cavities and polymer walls which separate the closed cavities from each other.

According to an embodiment of the present invention, for example, a size range of the closed cavities is from 20 μm to 800 μm, preferably, the size range of the closed cavities is from 50 μm to 300 μm, preferably, the size range of the closed cavities is from 60 μm to 200 μm, further preferably, the size range of the closed cavities is from 80 μm to 120 μm.

According to an embodiment of the present invention, for example, a thickness of the polymer walls is from 0.02 μm to 2 μm; preferably, the thickness of the polymer walls is from 0.03 μm to 1.0 μm; preferably, the thickness of the polymer walls is from 0.04 μm to 0.8 μm; preferably, the thickness of the polymer walls is from 0.05 μm to 0.6 μm; preferably, the thickness of the polymer walls is from 0.1 μm to 0.5 μm.

According to an embodiment of the present invention, for example, the polymer walls comprise a three-layered structure, wherein, materials of two outer layers are the same, and materials of the two outer layers are different from that of the intermediate layer sandwiched between the two outer layers.

An embodiment of the present invention provides a closed porous composite material, wherein, the closed porous composite material comprises a plurality of closed cavities and polymer walls which separate the closed cavities from each other; a size range of the closed cavities is from 20 μm to 800 μm, preferably, the size range of the closed cavities is from 50 μm to 300 μm, preferably, the size range of the closed cavities is from 60 μm to 200 μm, further preferably, the size range of the closed cavities is from 80 μm to 120 μm; and a density of the closed porous composite material is from 5 $kg/m^3$ to 300 $kg/m^3$, preferably, the density of the closed porous composite material is from 10 $kg/m^3$ to 200 $kg/m^3$, preferably, the density of the closed porous composite material is from 20 $kg/m^3$ to 150 $kg/m^3$, preferably, the density of the closed porous composite material is from 30 $kg/m^3$ to 100 $kg/m^3$, preferably, the density of the closed porous composite material is from 40 $kg/m^3$ to 90 $kg/m^3$, preferably, the density of the closed porous composite material is from 50 $kg/m^3$ to 80 $kg/m^3$, preferably, the density of the closed porous composite material is from 60 $kg/m^3$ to 80 $kg/m^3$.

According to an embodiment of the present invention, for example, the closed porous composite material is consisting of a plurality of closed cavities and polymer walls which separate the closed cavities from each other.

According to an embodiment of the present invention, for example, a thickness of the polymer walls is from 0.01 μm to 5 μm; preferably, the thickness of the polymer walls is from 0.02 μm to 2 μm; preferably, the thickness of the polymer walls is from 0.03 μm to 1.0 μm; preferably, the thickness of the polymer walls is from 0.04 μm to 0.8 μm; preferably, the thickness of the polymer walls is from 0.05 μm to 0.6 μm; preferably, the thickness of the polymer walls is from 0.1 μm to 0.5 μm.

According to an embodiment of the present invention, for example, the polymer walls comprise a three-layered structure, wherein materials of two outer layers are the same, and materials of the two outer layers are different from the material of the intermediate layer sandwiched between the two outer layers.

According to an embodiment of the present invention, for example, a thermal conductivity of the closed porous composite material is less than 0.030 w/m·k; preferably, the thermal conductivity of the closed porous composite material is less than 0.025 w/m·k; preferably, the thermal conductivity of the closed porous composite material is less than 0.020 w/m·k; preferably, the thermal conductivity of the closed porous composite material is less than 0.016 w/m·k. The thermal conductivity is determined by the method described in embodiments 26-36 of the present specification.

An embodiment of the present invention provides a soundproof material, wherein, the soundproof material comprises the closed porous composite material as described above.

An embodiment of the present invention provides a sound absorbing material, wherein, the sound absorbing material comprises the closed porous composite material as described above.

An embodiment of the present invention provides a clothing, wherein, the clothing comprises the closed porous composite material as described above; or the clothing comprises the thermal insulation material as described above.

According to an embodiment of the present invention, for example, the clothing further comprises a fabric and a lining, wherein the closed porous composite material or the thermal insulation material is arranged between the fabric and the lining.

An embodiment of the present invention provides a tent, wherein, the tent comprises the closed porous composite material as described above; or the tent comprises the thermal insulation material as described above.

An embodiment of the present invention provides a sleeping bag, wherein, the sleeping bag comprises the closed porous composite material as described above; or the sleeping bag comprises the thermal insulation material as described above.

An embodiment of the present invention provides shoes, wherein, the shoes comprise the closed porous composite material as described above; or the shoes comprise the thermal insulation material as described above.

An embodiment of the present invention provides a wallpaper, wherein, the wallpaper comprises the closed porous composite material as described above; or the wallpaper comprises the thermal insulation material as described above.

An embodiment of the present invention provides a carriage, wherein, the carriage comprises the closed porous composite material as described above; or the carriage comprises the thermal insulation material as described above.

An embodiment of the present invention provides an aircraft cabin, wherein, the aircraft cabin comprises the closed porous composite material as described above; or the aircraft cabin comprises the thermal insulation material as described above.

An embodiment of the present invention provides a refrigerator, wherein, the refrigerator comprises the closed porous composite material as described above; or the refrigerator comprises the thermal insulation material as described above.

BRIEF DESCRIPTION OF THE DRAWINGS

In order to explain the technical scheme of the embodiments of the present invention more clearly, the drawings of the embodiments will be briefly introduced. It is obvious that the drawings in the following description only refer to some embodiments of the invention, and should not be regarded as limitations of the present invention.

DETAILED DESCRIPTION

Figure 1:
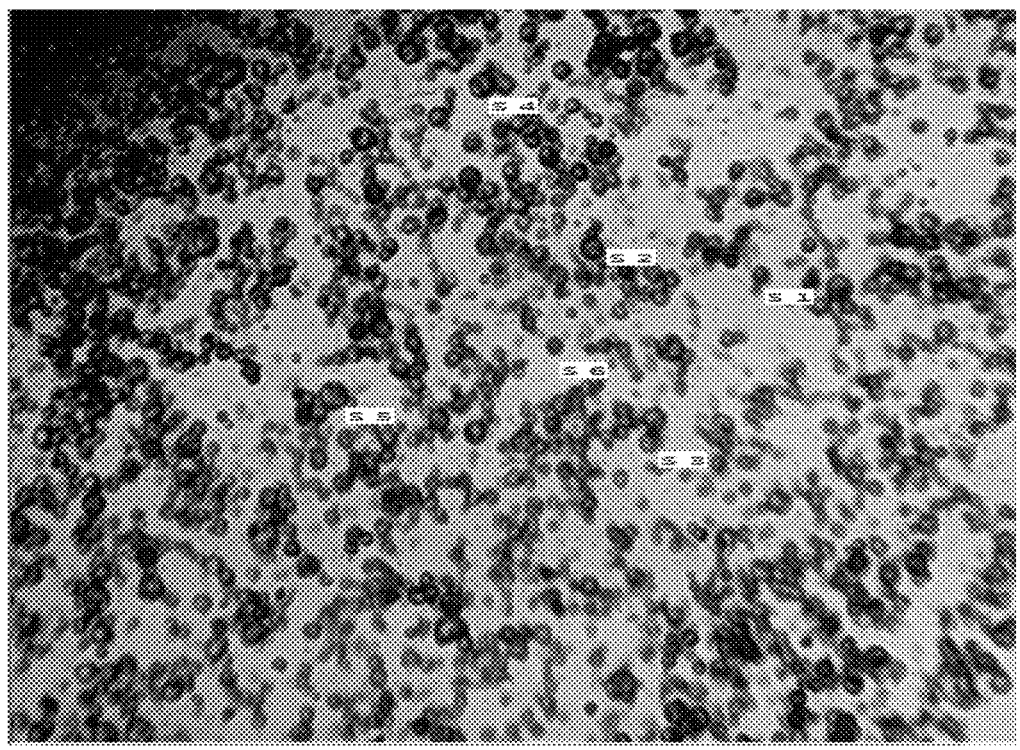
FIG. 1 is a microscopical photo showing the unexpanded thermo-expandable microspheres used in the embodiments of the present invention.

In order to make the object, technical scheme and advantages of the embodiments of the present invention clearer, the technical scheme of the embodiments of the present invention will be described clearly and completely in combination with the drawings of the embodiments of the invention. Obviously, the described embodiments are part, but not all of the embodiments of the present invention. Based on the described embodiments of the present invention, all other embodiments obtained by those skilled in the art without creative work fall in the scope of protection of the invention.

Unless otherwise defined, the technical terms or scientific terms used in the present disclosure shall be the general meaning understood by those having general skills in the field of the present invention. Unless otherwise specified, the term "part" refers to the weight part.

Human is homothermal animal, and human body itself is a heat source that constantly generates heat. The heat that is constantly generated needs to be continuously released. In hot summer, the heat of the body is released slowly, and we will feel hot; in cold winter, when the heat of the body is released quickly, we will feel cold. When people feel cold, according to life experience, people usually add clothes or change for thicker clothes. However, why can you keep warm by adding clothes or changing into thicker clothes? We have to consider the main ways of heat loss. Generally speaking, heat is lost mainly through three ways: heat conduction, heat convection and heat radiation. Heat radiation refers to: all objects with temperature higher than absolute zero constantly radiate electromagnetic wave to the surrounding space. The higher the temperature is, the greater the total energy is radiated and the more short-wave components will be. Adding clothes or changing thicker clothes mainly affects the heat conduction and heat convection to keep warm and has little effect on the heat radiation. In the case of warm clothing, hot body transfers heat to the clothing in contact with the body, and the heat will eventually be distributed to the cold atmosphere through the clothing. Heat convection is the heat exchange between the air on the surface of human body and the cold air around. Therefore, in order to improve thermal insulation performance of clothing, on the one hand, we should try to choose materials having low heat conductivity for clothing; on the other hand, we should try to reduce the chances of exchange between the air on the surface of human body and the cold atmosphere around.

Among the known materials, thermal conductivity of the static air is the lowest. Therefore, fluffy thermal insulation materials, such as cotton, down and so on are generally chosen for cold proof clothing. These fluffy materials are packed with a lot of air, so they have better thermal insulation effect than other dense materials. However, the thermal insulation performance of these known thermal insulation materials is still not good enough. In order to resist cold in winter, we need to make the clothes thicker, which brings about the above-mentioned shortcomings (hindering the free movements of the body, unable to meet people's aesthetic requirements).

The present disclosure provides a kind of thermal insulation material, which mainly uses non-traditional organic materials as thermal insulation materials. It can greatly surpass the traditional thermal insulation materials in carrying as much air as possible and preventing the circulation between the air carried by the material with the outside air. According to the principle of static air insulation: under the same porosity, the larger the pore size is, the greater the thermal conductivity is. The thermal conductivity of interconnected pores is higher than that of closed pores. The higher the proportion of the closed porosity is, the lower the thermal conductivity is. At the same time, due to the above characteristics, this kind of material can not only be used for heat preservation and insulation, but also can be widely used in other fields, such as sound insulation (soundproof) and sound absorption.

Tents are necessary equipment for outdoor sports. Thermal insulation and warmth preservation are major technical difficulties that always persecute the global tent enterprises. The successful development of the closed porous composite material of the present disclosure (when used for thermal insulation, it is thermal insulation material) makes the tents light, cool in summer and warm in winter.

Because of the environment, climate and sweat, the thermal insulation performance of the traditional clothing decreased greatly. Particularly, the down jacket will lose the thermal insulation ability after it becomes damp. In the following, thermal insulation properties of the thermal insulation materials of the present disclosure in wet condition are tested. Tests and judgments are carried out by a third party: Jingjianyihe (Beijing) Product Quality Supervision and Testing Center. Test method: GB/T11048-2008 A; Test number: NB201804008. The standard samples were tested for routine do value, weighed and the results were recorded, and then the standard samples were immersed in a basin filled with tap water for 3 minutes and completely soaked, and then the samples were taken out and put in the shade for 30 minutes until no water drops out. The standard samples felt wet. The moisture content was determined to be 10% by weighting the samples. The do value was tested again and compared with the previous result, it turned out that the clo value decreases by 3.6%. This result proves that the thermal insulation material keeps its thermal insulation properties under wet conditions. If outdoor sports amateurs use the clothing and equipment made of the thermal insulation materials provided by the present disclosure, the outdoor exploration will be safer and more confident when challenging the limit.

Put the thermal insulation material into the freezer under −40° C. for 30 minutes, then took it out for test and comparison, the thermal insulation material of the present disclosure has no change in thickness, hand feeling and appearance. It can be imagined that some equipment needs thermal insulation and warmth preservation when parked and used outdoors. The protective device made of the thermal insulation material of the present disclosure is lighter, thinner and more effective than the current materials.

When cars are parked outdoors for a long time, the temperature in the cars will be extremely high. At the moment of opening the door, the heat wave is blowing, the seat is boiling hot, and the effective service life of the car is shortened. As long as the new thermal insulation materials provided by the present disclosure are used between the car roof, the surrounding decorative surface and the car body steel plate, the temperature in the car can drop 15° C.-25° C. compared with ordinary cars. At the same time, the thermal resistance produced by the thermal insulation materials in the present disclosure, whether in winter or summer, the use intensity of the air conditioner in the car and the fuel consumption can be greatly reduced, and the sound insulation performance is also improved.

Being fit, breathable, light, and warm even be damp, the materials provided by the present disclosure is the best choice for ideal winter shoes. The application of the thermal insulation materials of the present disclosure will boost the global footwear designers and manufacturers to realize the dream of technological innovation, and bring consumers a new experience and more choices in winter foot warmth and wearing fashion.

The thermal insulation materials provided by the present disclosure will bring a new experience for audio amateurs. The sound insulation and sound absorption effects of the rooms using the thermal insulation material of the present disclosure will be greatly improved. At the same time, the noise is greatly reduced, the thermal insulation effect is enhanced, and people will live more comfortably.

At present, the thick thermal insulation layer in the refrigerator makes it bulky. The application of the thermal insulation material of the present disclosure can reduce the thickness of the thermal insulation layer of the refrigerator by 60%, and the storage space of the refrigerator will become larger. The refrigerator adopting the new materials of the present disclosure will change its bulky image.

Eavesdropping is usually achieved by capturing the sound that vibrates the window glass. If the curtain is made of the thermal insulating material of the present disclosure, not only the eavesdropping can be prevented, but also thermal insulation and warmth preservation can be achieved.

The application of the thermal insulation materials provided by the present disclosure in winter gloves not only keeps warm, but also makes finger movement nimbler and increases work efficiency.

The technical scheme of the present disclosure will be further described in combination with the embodiments.

The following test methods are used in the present disclosure.

Temperature difference test (the greater the temperature difference is, the better the thermal insulation performance is):

The instruments used include HP-2020 constant temperature heating table, four channel thermometer YHT309 provided by Yuanhengtong, and surface contact mesh probe TP-K03 provided by Taishi TES, Taiwan.

The test method includes: set the temperature of the heating table at 60° C., and place the samples of the heat insulation material having a size of 5 cm long and 3 cm wide on the heating table. During the test, the heating table is always kept at a constant temperature, and one end of the thermal insulation material is pressed by an object to prevent movement until the end of the test.

One probe directly contacts the surface of the heating table, and the other probe contacts the surface of the thermal insulation material on the heating table. The distance between the two probes is 2 cm. Hold the probe handle with both hands steadily, and the four-channel thermometer YHT309 shows that the temperature values of the two groups are stable for 10 seconds. Record the surface temperature and test time of the heating table and the surface of the thermal insulation material, respectively. The test is carried out once every 15 minutes, 4 times in total.

The temperature difference is the sum of the four surface temperatures of the heating table minus the sum of the four surface temperatures of the thermal insulation material.

Test of Clo Value:

Tests are carried out by a third party: Jingjianyihe (Beijing) Product Quality Supervision and Testing Center according to Test method: GB/T11048-2008 A.

Definition of do value: when a person who sits quietly or engages in light mental work (metabolic heat production is 209.2 KJ/$m^2$·h), feels comfortable in an environment with room temperature of 21° C., relative humidity of less than 50%, and wind speed of no more than 0.1 m/s, the thermal resistance of the clothes he/she wears is 1 clo.

Thermal Conductivity Test:

The hot disk Transient plane heat source method is adopted, and the thermal conductivity test conditions are as follows:

Equipment model: TPS3500
Test module: basic module, single side method
Probe model: Kapton 7577
Heating power: 10 mw
Test time: 1 s
Ambient temperature during test: 26±0.5° C.
Background material in lower part: quartz
Background material in upper part: polystyrene foam The composition of commodities used in the present disclosure is as follows. Water dispersing resin Leasys3458: an anionic water based polyurethane dispersion (aliphatic group), with a solid content of about 50 wt %; Water dispersing resin Impranil DLS: an anionic water based polyurethane dispersion (aliphatic group, polyester type), with a solid content of about 50 wt %; Impranil 1537: an anionic water based polyurethane dispersion (aliphatic group, polyester type), with a solid content of about 60 wt %; Unexpanded thermo-expandable microspheres Expancel 043 DU 80: small spherical plastic particles, the microspheres are composed of a of polymer shell and the substance in it (the substance can expand under certain conditions), when heated, the internal pressure of the substance increases and the thermoplastic shell becomes soft, resulting in the increase of the volume of the microspheres and the substance still remain inside the spheres; defoamer BYK 093: a mixture of polysiloxane and hydrophobic solid dispersed in polyethylene glycol; wetting agent BYK 348: a polyether modified siloxane, non-volatile >96 wt %; thickener LYOPRINT PTF: a kind of acrylic polymer dispersion; water-based color paste NV 6800: a kind of water-based dispersion with solid content of about 40 wt %.

Examples 1-4 Effects of Adding Amount of Thermo-Expandable Microspheres

Example 1 prepares various components according to the following formula:
Water dispersing resin Leasys3458: 100 g
Unexpanded thermo-expandable microspheres Expancel 043 DU 80: 40 g
Deionized water: 300 g
Defoamer BYK 093: 0.3 g
Wetting agent BYK 348: 1 g
Thickener LYOPRINT PTF: 1 g
Water-based color paste NV 6800: 20 g It should be noted that the weight of the water dispersing resin in the claims of the present application refers to the dry weight. The water dispersing resin used in the embodiments is a water-based dispersion with water content. Therefore, conversion is needed according to the solid content. The water in the formula mainly comes from the deionized water added, the water in the water dispersing resin and the water in the water-based color paste. However, for the thermo-expandable microspheres, defoamer, wetting agent and thickener, either the water content is very small, or the influence on the total amount of water in the formula can be ignored due to the small amount used. The formula after conversion is: water dispersing resin Leasys3458: 50 g by dry weight; thermo-expandable microspheres Expancel 043 DU 80: 40 g; deionized water: 300 g+50 g (from water dispersing resin Leasys3458)+12 g (from water-based color paste NV 6800)=362 g; defoaming agent BYK 093: 0.3 g; wetting agent BYK 348: 1 g; thickener LYOPRINT PTF: 1 g; water-based color paste NV 6800: 8 g by dry weight. The following examples can be converted in the same way without repetition.

Under mixing with a high-speed mixer, the above components are added to the mixing kettle sequentially, and the mixing speed is 1000-1500 rpm. After all components are added, keep mixing for 0.5-1 hour. Crosslinker can be added selectively before coating, and the crosslinker may comprise, for example, polycarbonate diimide, polyisocyanate, blocked polyisocyanate, aziridine or amino resin.

The above formula is applied on a 0.28 mm thick base cloth, the coating amount (wet weight) is 65 g/$m^2$, and then baked in an oven at 140° C. for 1 minute. A thickness of the coating sample is 0.52 mm. Among them, Leasys3458 is the trade name of a water dispersing resin, Expancel 043 DU 80 is the trade name of the thermo-expandable microspheres, BYK 093 is the trade name of the defoamer, BYK 348 is the trade name of the wetting agent, LYOPRINT PTF is the trade name of the thickener, NV 6800 is the trade name of the water-based color paste. It should be noted that, the specific substances mentioned above are only for illustration, not for limitation of the present invention. Among the above components, the most critical components are water dispersing resin and unexpanded thermo-expandable microspheres, while other components can be omitted according to specific application scenarios. During the heating process, the unexpanded thermo-expandable microspheres will expand, and its volume will expand 2-50 times. At the same time, the water will evaporate, and finally form a multi-independent space structure product consisting of a number of (very large number) closed spheres, quasi spheres or irregular shapes (formed by mutual extrusion during the microsphere expansion) of closed cavities. The superposed multi-independent space structure product comprises a large number of closed cavities and polymer walls separating the large number of closed cavities from each other. The polymer walls comprise a thermoplastic or thermosetting polymer material (i.e. material from the thermo-expandable microspheres) on the inner side toward the closed cavity, and comprise water dispersing resin (i.e. material from the water dispersing resin) on the outer side toward the closed cavity. In most cases, the thermo-expandable microspheres are fully expanded, and the adjacent microsphere walls contact with each other to form a sandwich polymer wall. The materials of the two outer layers of the polymer walls are the same (both from the thermo-expandable microspheres), and the materials of the two outer layers are different from the materials of the intermediate layer sandwiched between the two outer layers (from the water dispersing resin).

The operation of examples 2-4 is the same as that of example 1, but the contents of the thermo-expandable microspheres are adjusted. The formulations of embodiments 1-4 are listed in the following table:

perature difference" reflects the thermal insulation performance under the same coating sample thickness, so it can better realize the thermal insulation performance than "temperature difference") is not as high as that of embodiment 2. Compared the experimental results of examples 2, 3 and 4, it can be concluded that, under the same coating amount (wet weight), the higher the microsphere content is, the greater the temperature difference (the better the thermal insulation performance) will be. Water dispersing resin Leasys 3458 has an ordinary adhesion for microspheres. When the amount of thermo-expandable microspheres exceeds the limit of the adhesion strength of water dispersing resin, the larger the amount of microspheres is, the worse the coating rub fastness is, and the more serious the surface pulverization is (for the evaluation of the coating rub fastness, it gets better from left to right according to the following order: poor→relatively poor→relatively good→good; for clothing products, the coating rub fastness being good or relatively good can meet the application requirements; for other applications, such as building wall insulation materials, the application conditions can also be met in the case of poor or relatively poor coating rub fastness). Only consider the "normalized temperature difference" data, good thermal insulation performance is obtained under the microsphere dosage of 10 g, 20 g and 30 g.

TABLE 1

Formula (unit: gram) and performance characterization of examples 1-4

| Example | 1 | 2 | 3 | 4 |
|---|---|---|---|---|
| Leasys3458 | 100 | 100 | 100 | 100 |
| Expancel 043 DU 80 | 40 | 30 | 20 | 10 |
| Deionized water | 300 | 300 | 300 | 300 |
| BYK 093 | 0.3 | 0.3 | 0.3 | 0.3 |
| BYK 348 | 1 | 1 | 1 | 1 |
| LYOPRINT PTF | 1 | 1 | 1 | 1 |
| NV 6800 | 20 | 20 | 20 | 20 |
| Coating amount (wet weight) | 65 ± 5 g/m$^2$ | 65 ± 5 g/m$^2$ | 65 ± 5 g/m$^2$ | 6 ± 5 g/m$^2$ |
| Baking conditions | 1 minute under 140° C. | 1 minute under 140° C. | 1 minute under 140° C. | 1 minute under 140° C. |
| Coating sample thickness [1] | 0.52 mm | 0.42 mm | 0.32 mm | 0.17 mm |
| Temperature difference | 9.3° C. | 10.1° C. | 7.6° C. | 4.3° C. |
| Coating strength | poor | poor | Relatively poor | Relatively poor |
| Normalized temperature difference [2] | 17.88° C. | 24.05° C. | 23.75° C. | 25.29° C. |

[1] "Coating sample thickness" is the thickness of the dry coating attached to the base cloth, the same below;
[2] Because the temperature difference is approximately proportional to the thickness of the coating sample, the "normalized temperature difference" is calculated by normalizing the thickness of the coating sample to 1 mm. It should be noted that the influence of the base cloth (carrier) on the thermal insulation performance (including temperature difference", "normalized temperature difference", and later "clo value", normalized "clo value") is ignored in all embodiments of this paper. This is due to the strong thermal conductivity of the base cloth polyester fiber, which makes little contribution to the thermal insulation performance. For example, for the 0.28 mm thick base cloth used in embodiments 1-24, the temperature difference measured under the same test conditions is less than 0.8° C., while for the 0.15 mm thick base cloth used in embodiment 25, the temperature difference measured under the same test conditions is less than 0.2° C. This temperature difference is due to the insulation effect of the air stored in the fluffy base fabric yarn. After the base cloth is coated, the space between the yarns has been filled by the thermo-expandable microspheres, and the air stored in the base material is no longer present. The effect of the thermal insulation of the base cloth on the thermal insulation performance of the final product can be ignored.

Theoretically, if the amount of thermo-expandable microspheres become larger and the coating become thicker, the proportion of the volume of the sealed cavity in the coating will be larger, the temperature difference of the coating will be greater, and the thermal resistance will be better. However, there is a problem caused by the large amount of thermo-expandable microspheres, that is, it will affect the adhesion of the dry coating. Therefore, the normalized temperature difference of embodiment 1 ("normalized tem- Example 5-7 Effect of Different Water Dispersing Resins on Coating Rub Fastness The operation of examples 5-7 is the same as that of example 1, but the contents of the water dispersing resins are adjusted. The formulations of embodiments 5-7 are listed in the following table:

TABLE 2

Formula (unit: gram) and performance characterization of examples 5-7

| Examples | 5 | 6 | 7 |
|---|---|---|---|
| Leasys3458 | 100 | 0 | 0 |
| Impranil DLS | 0 | 30 | 30 |
| Impranil 1537 | 0 | 70 | 70 |
| Expancel 043 DU 80 | 10 | 10 | 20 |
| Deionized water | 300 | 300 | 300 |
| BYK 093 | 0.3 | 0.3 | 0.3 |
| BYK 348 | 1 | 1 | 1 |
| LYOPRINT PTF | 1 | 1 | 1 |
| NV 6800 | 20 | 20 | 20 |
| Coating amount (wet weight) | 65 ± 5 g/m² | 65 ± 5 g/m² | 65 ± 5 g/m² |
| Baking conditions | 1 minute under 140° C. | 1 minute under 140° C. | 1 minute under 140° C. |
| Coating sample thickness | 0.17 mm | 0.22 mm | 0.32 mm |
| Temperature difference | 4.3° C. | 6.9° C. | 8.6° C. |
| Coating strength | Relatively poor | Relatively good | Relatively good |

Compared with using only one water dispersing resin Leasys3458 (example 5), the formulation (example 6), which employs a mixture of two kinds of water dispersing resins Impranil DLS and Impranil 1537, has significantly improved the adhesion strength of the microspheres and enhanced the coating strength. Due to the enhanced coating strength, the expanded microspheres did not fall off after the sample was formed, so that the temperature difference of the sample prepared in example 6 was significantly greater than that of the sample prepared in example 5. At the same time, comparing examples 6 and 7, it can also be found that under the same or similar conditions, the higher the microsphere content, the higher the coating thickness of the sample was, the greater the temperature difference, so the better the thermal resistance (thermal insulation) performance would be.

Examples 8-12 Effect of Different Water Content on Thermal Resistance, and Composition and Structure of Thermal Insulation Materials The preparation process of embodiments 8-12 is the same as that of embodiment 1, but the amount of water is adjusted. The formulations of embodiments 8-12 are listed in the following table:

TABLE 3

Formula (unit: gram) and performance characterization of examples 8-12

| Examples | 8 | 9 | 10 | 11 | 12 |
|---|---|---|---|---|---|
| Impranil DLS | 30 | 30 | 30 | 30 | 30 |
| Impranil 1537 | 70 | 70 | 70 | 70 | 70 |
| Expancel 043 DU 80 | 20 | 20 | 20 | 20 | 40 |
| Deionized water | 300 | 200 | 100 | 0 | 0 |
| BYK 093 | 0.3 | 0.3 | 0.3 | 0.3 | 0.3 |
| BYK 348 | 1 | 1 | 1 | 1 | 1 |
| LYOPRINT PTF | 1 | 0.5 | 0.2 | 0.1 | 0.1 |
| NV 6800 | 20 | 20 | 20 | 20 | 20 |
| Coating amount (wet weight) | 65 ± 5 g/m² | 65 ± 5 g/m² | 65 ± 5 g/m² | 65 ± 5 g/m² | 65 ± 5 g/m² |
| Baking conditions | 1 minute under 140° C. | 1 minute under 140° C. | 1 minute under 140° C. | 1 minute under 140° C. | 1 minute under 140° C. |
| Coating sample thickness | 0.32 mm | 0.37 mm | 0.77 mm | 0.57 mm | 1.22 mm |
| Temperature difference | 8.6° C. | 9.3° C. | 11.5° C. | 10.1° C. | 15.1° C. |
| Coating strength | Relatively good | good | good | good | good |
| Normalized temperature difference * | 26.88° C. | 25.14° C. | 14.94° C. | 17.72° C. | 12.38° C. |

* Because the temperature difference is approximately proportional to the thickness of the coating sample, the "normalized temperature difference" is calculated by normalizing the thickness of the coating sample to 1 mm.

Compare the results of embodiments 8-12. In terms of composition, except that the amount of water and thickener is different, the dosage of other components is the same, the coating amount (wet weight) is the same, and the baking conditions are the same. The amount of water is gradually reduced from embodiment 8 to embodiment 12, so the amount of thickener is correspondingly reduced; there is no additional water in embodiments 11 and 12, and the amount of thermo-expandable microspheres in embodiment 12 is twice of that in embodiment 11. Comparing the results of embodiments 8-11, it can be seen that in the case of the same coating amount (wet weight), the thickness of the coating sample (i.e. the thickness of the product subtracting the thickness of base cloth) first increases, then decreases (embodiments 8, 9 and 10 increase successively, and then decreases to embodiment 11). The temperature difference shows the same trend as the thickness of the coating sample. It is easy to understood that embodiments 8, 9 and 10 increase in turn. When the amount of water decreases and the relative proportion of solid components increases, thickness of the final coating sample increases, as a result, the temperature difference increases and the thermal insulation effect increases under the same coating amount (wet weight). However, in the case of example 11, when compared with example 10, considering further reduction of water content, the thickness of final coating sample decreases and the temperature difference also decreases, which is contrary to the above reasoning. To understand this result, it is necessary to examine the role of water in the above scheme. The two most important components are water dispersing resin and thermo-expandable microspheres, and the importance of water follows closely. The function of the thermo-expandable microspheres is: when the microspheres are heated and expanded, a large number of closed cavities will be formed. In the process of expansion of the microspheres, the water dispersing resin will be stretched to reduce the volume density of the thermo-expandable microspheres and the water dispersing resin and improve the thermal insulation performance. However, it is not enough to have thermo-expandable microspheres. It is also necessary to glue the microspheres to form a whole with certain mechanical strength (for example, to form a flat layer having a certain thickness), so that they can be used in some specific application scenarios (for example, for the thermal insulation layer of clothing, or for the thermal insulation layer of the interior wall of buildings). And the water dispersing resin plays this role. Water has two main functions: one is to dilute the water dispersing resin to reduce the binding of the water dispersing resin to the thermo-expandable microspheres during the expansion process, so that the thermo-expandable microspheres can expand more freely and fully; the other is to reduce the solid content of the water dispersing resin to prevent the decrease of thermal resistance due to the high thermal conductivity of the water dispersing resin. It can be assumed that no additional water is added at all (so the mixture only comprises a small amount of water from the water dispersing resin and color paste) may cause two problems: first, the thermo-expandable microspheres are too much stuck and blocked by the water dispersing resin during the expansion process, and cannot fully and freely expand, the microsphere expansion is blocked and the ability to stretch and disperse the water dispersive resin is reduced, and the microsphere cannot fully expand, and the thermal insulation function of the microspheres is not fully utilized; second, the high thermal conductivity of water dispersing resin results in the decrease of thermal insulation capacity: because less water is used, the amount of water dispersing resin must be increased in unit weight formulation, while the thermal conductivity of water dispersing resin is higher, and the increase of its amount will inevitably lead to the increase of thermal conductivity, that is, the decrease of thermal insulation performance. In consideration of the above factors, the results of embodiment 11 are easy to understand. Because no additional water was added in embodiment 11, a part of the microspheres are bound too much by the water dispersing resin, so they are crowded together and cannot fully expand, and the high content of the water dispersing resin decreases the thermal insulation performance. Therefore, under the same coating amount (wet weight), the thickness of the final coating sample becomes smaller and the temperature difference becomes smaller.

Judging from the data "normalized temperature difference" in embodiments 8-12, under the other conditions remain same or similar, when the amount of additional water is 200 g and 300 g, the thermal insulation effect is the best. Generally, it is better to add 150-350 weight parts of water for every 100 weight parts of water dispersing resin (wet weight).

Figure 2:
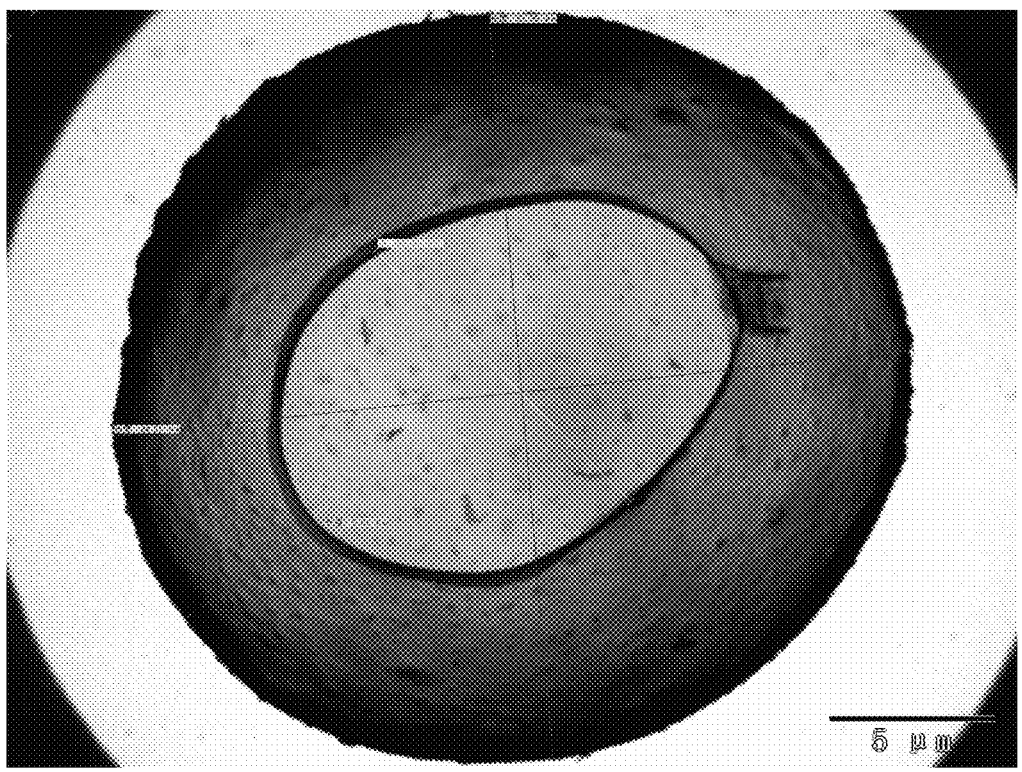
FIG. 2 is a transmission electron microscope (TEM) photo showing one single unexpanded thermo-expandable microsphere used in the embodiments of the present invention.

Further investigate the structure and composition of the product. FIG. 1 shows a microscopical picture of the unexpanded thermo-expandable microsphere used in the embodiments of the present invention. The thermo-expandable microspheres used in the embodiments of the present invention is Expancel 043 DU 80, the average particle size is about 16 μm-24 μm, and the material of the walls of the microspheres is thermoplastic or thermosetting polymer material, which can expand after heating, and the diameter increases to 2-10 times of the original diameter. The shape of a single thermo-expandable microsphere can be seen in FIG. 2. It can be seen from FIG. 1 that the unexpanded thermo-expandable microsphere presents regular spherical or quasi spherical particles. It can be seen from FIG. 2 that a single microsphere presents a nearly spherical ellipsoid shape, with a long axis (outer diameter) length of 24.2 μm, a short axis (outer diameter) length of 22.6 μm and a wall thickness of about 5 μM. It should be noted that if other thermo-expandable microspheres having different materials or sizes are selected, the relevant structures and materials will change, but these contents (specific materials and structures of the microspheres) should not be understood as restrictions on the scope of protection of the present invention.

Figure 3:
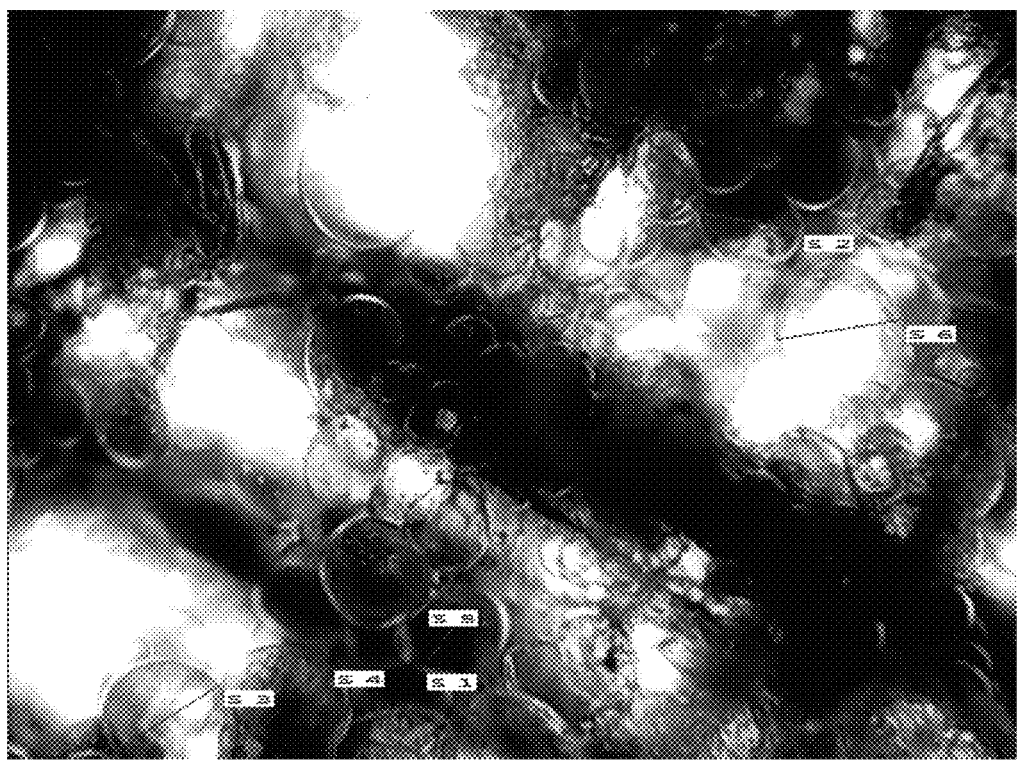
FIG. 3 is a micrograph of the final product obtained in an embodiment of the present invention, and it can be seen from the micrograph that most of the expanded thermo-expandable microspheres are regular spherical or quasi spherical.

The micrograph of the final product obtained in example 10 is shown in FIG. 3. It can be seen from FIG. 3 that most of the expanded microspheres are regular or quasi spherical. In some areas, the expanded microspheres may appear irregular shape due to the severe extrusion between the microspheres. For the convenience of description, "size" herein refers to the diameter of a regular sphere; for a quasi-sphere or irregular shape, "size" herein refers to the diameter of a sphere having the same volume as such sphere or irregular shape. Compared with FIG. 1, FIG. 3 shows that after heating and expansion, the volume of microspheres increases several times, and the spherical wall becomes thinner and transparent.

Example 13-17 Effect of Different Baking Temperature on Results

The preparation process of embodiments 13-17 is the same as that of embodiment 1, but the baking temperature is adjusted. The formulations of embodiments 13-17 are listed in the table below:

TABLE 4

Formula (unit: g) and performance characterization of embodiments 13-17

| Example | 13 | 14 | 15 | 16 | 17 |
| --- | --- | --- | --- | --- | --- |
| Impranil DLS | 30 | 30 | 30 | 30 | 30 |
| Impranil 1537 | 70 | 70 | 70 | 70 | 70 |
| Expancel 043 DU 80 | 20 | 20 | 20 | 20 | 20 |
| Deionized water | 200 | 200 | 200 | 200 | 200 |
| BYK 093 | 0.3 | 0.3 | 0.3 | 0.3 | 0.3 |
| BYK 348 | 1 | 1 | 1 | 1 | 1 |
| LYOPRINT PTF | 0.5 | 0.5 | 0.5 | 0.5 | 0.5 |
| NV 6800 | 20 | 20 | 20 | 20 | 20 |
| Coating amount (wet weight) | 65 ± 5 g/m$^2$ | 65 ± 5 g/m$^2$ | 65 ± 5 g/m$^2$ | 65 ± 5 g/m$^2$ | 65 ± 5 g/m$^2$ |
| Baking conditions | 1 minute under 140° C. | 1 minute under 130° C. | 1 minute under 120° C. | 1 minute under 110° C. | 1 minute under 150° C. |
| Coating sample thickness | 0.37 mm | 0.32 mm | 0.24 mm | 0.14 mm | 0.37 mm |
| Temperature difference | 9.3° C. | 8° C. | 6.8° C. | 4° C. | 9.5° C. |
| Coating strength | good | good | good | good | good |

From the results listed in the above table, it can be seen that under the premise of the same formula and the same coating amount (wet weight), the coating thickness and thermal insulation performance (temperature difference) are related to the baking temperature. The lower the temperature is, the smaller thickness of the dry coating film is, and the worse the thermal insulation is (due to insufficient expansion of the thermo-expandable microspheres); when the temperature is up to 140° C.-150° C., the coating thickness and temperature difference are the highest, and the best baking temperature is 140° C.-150° C. It should be noted that this optimum baking temperature range is related to the baking equipment and the composition and structure of the thermo-expandable microspheres used. The thermo-expandable microspheres used in the present embodiment is Expancel 043 DU 80. If other different baking equipment and/or thermo-expandable microspheres are used, the optimal baking temperature range may change.

Figure 4:
FIG. 4 is a scanning electron microscope (SEM) photo of the final product obtained in an embodiment of the present invention.
Figure 5:
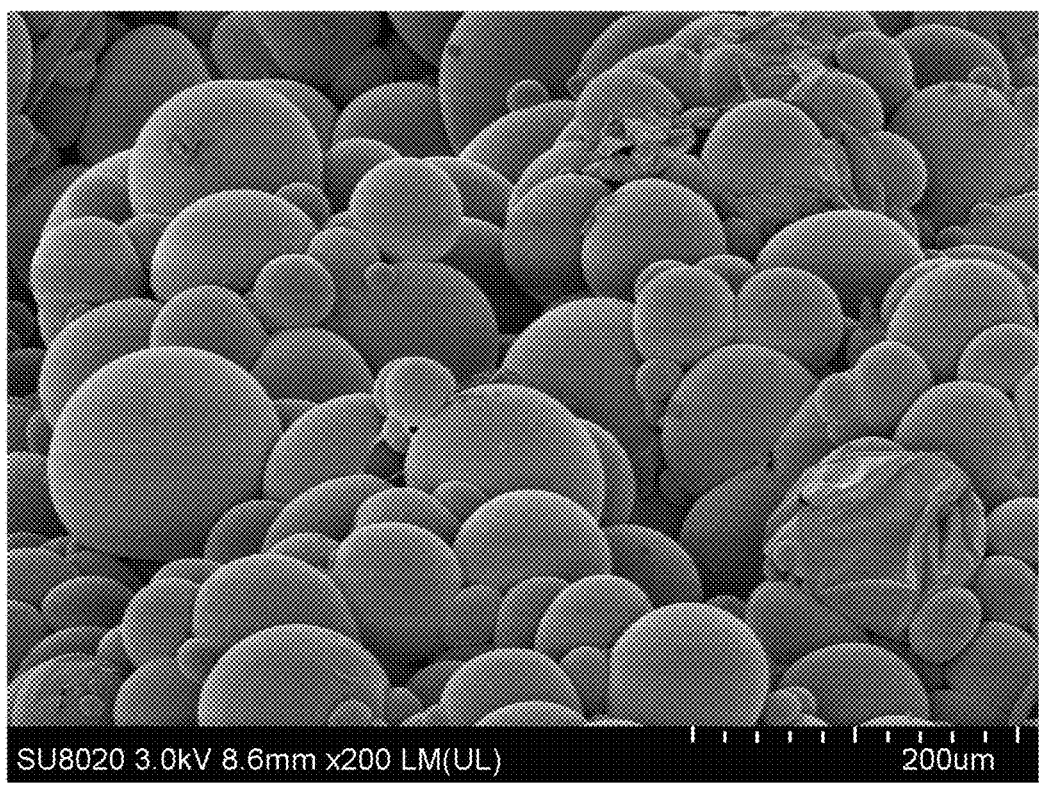
FIG. 5 is a scanning electron microscope (SEM) photo of the final product obtained in another embodiment of the present invention.
Figure 6:
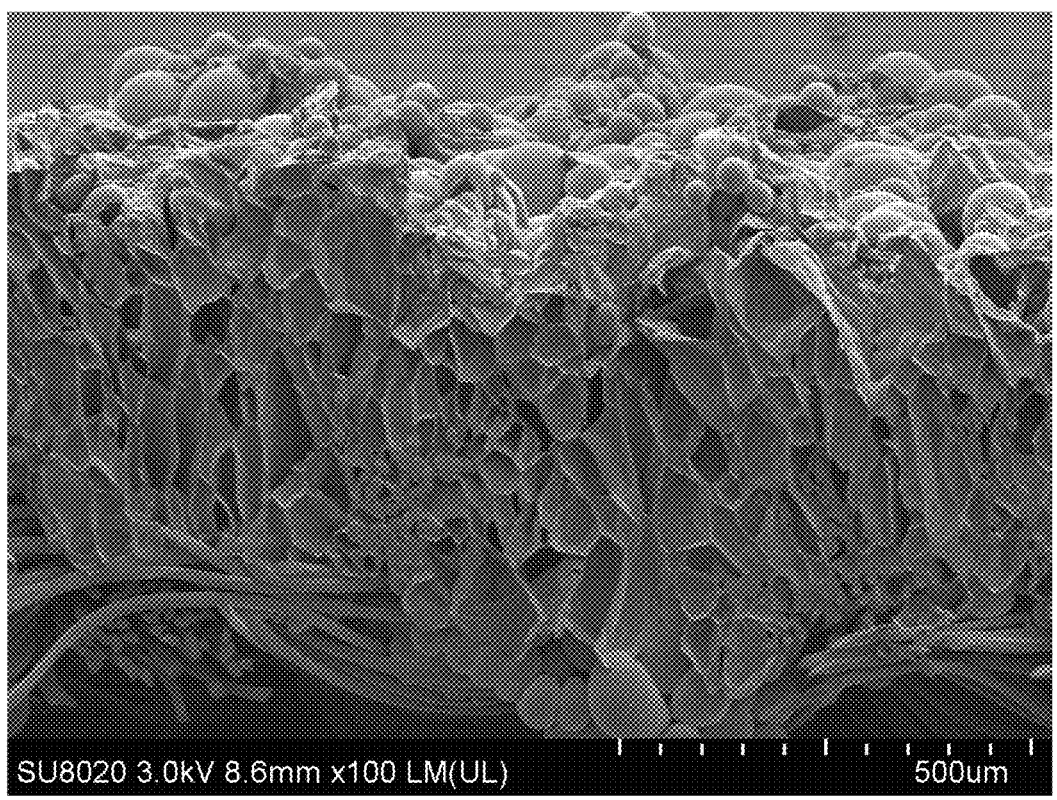
FIG. 6 is a scanning electron microscope (SEM) photo of the final product obtained in another embodiment of the present invention.
Figure 7:
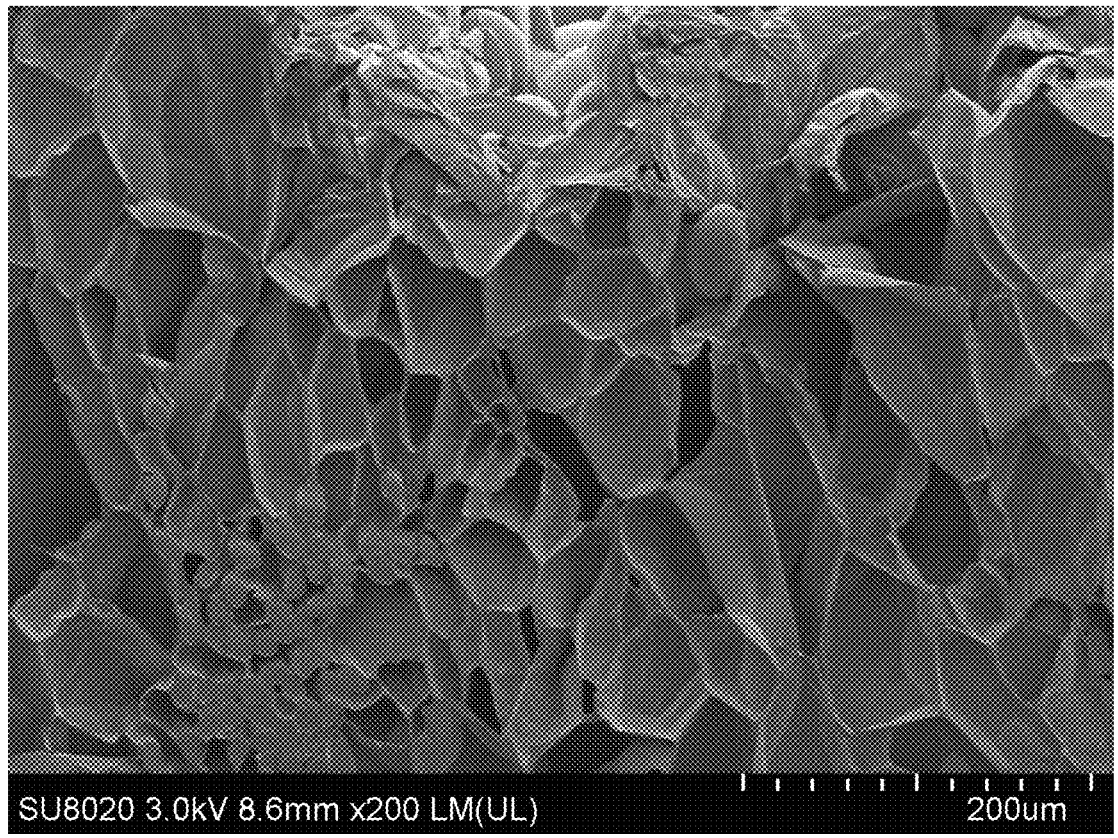
FIG. 7 is a scanning electron microscope (SEM) photo of the final product obtained in another embodiment of the present invention.

The SEM photo of the final product obtained in example 17 is shown in FIGS. 4-7. FIG. 4 is the SEM photo of the product obtained directly, FIG. 5 is the SEM photo of the further enlarged product; FIG. 6 is the SEM cross section photo of the product, and FIG. 7 is the further enlarged SEM cross section photo of the product. It can be seen from FIGS. 4-5 that the diameter of most of the expanded microspheres is about 100 μm. It should be noted that the ruler in the lower right corner of the figure refers to the length of the whole ruler. Take FIG. 4 as an example. From the leftmost white line to the rightmost white line represents 500 μm, so the distance between the two adjacent white lines is 50 μm. The fiber seen in the upper left part of FIG. 4 is the fiber in the base material, not the thermal insulation material. Because the polyester yarn used in the base cloth has strong thermal conductivity, in order to obtain better thermal insulation effect, the microspheres should be fully covered over the base cloth after expansion. The sizes of the expanded microspheres are affected by many factors, such as the composition and structure of the thermo-expandable microspheres, the heating temperature and time of the expansion process, the proportion of each component and so on. In addition, the sizes of the expanded microspheres are also affected by many random factors, for example, the insufficient heat at some positions leads to insufficient expansion of the microspheres, the excessive heat at some positions leads to excessive expansion of the microspheres, and the complete non expansion of some microspheres due to structural defects (such as internal gas leakage, etc.). Therefore, even in the materials with good foaming, there are some microspheres having very large or very small size. For example, as can be seen from FIG. 4, most microsphere sizes are distributed in the range of 50 μm to 150 μm, but there are also some small microspheres having size of about 20 μm, and some microspheres having sizes more than 250 μm. It can be seen from FIGS. 4-6 that the expanded microspheres are closely gathered together. As the microspheres are bonded together by water dispersing resin, it can be inferred that most of the space between the microspheres is also closed. From FIG. 4 and FIG. 5, a very small number of ruptured thermo-expandable microspheres can be seen (for example, the lower left corner of FIG. 4 and the lower right corner of FIG. 5). In an ideal situation, each thermo-expandable microsphere is fully expanded and does not rupture (thus ensuring the internal space is closed). However, there are some uncontrollable factors in the heating process, such as local overheating or some microsphere defects. However, the cracking of individual microspheres does not have a fundamental impact on the thermal insulation performance of the final product. There are at least two reasons: 1) the proportion of broken microspheres is quite small, which should be less than 1% judging from FIG. 4; 2) even if individual microspheres are broken, due to the overcrowding of a large number of other microspheres around, the internal space of the broken microspheres is closed again. Therefore, in fact, during the process of manufacturing the closed porous composite material in the embodiments of the present disclosure, as long as the heating temperature is not too high and the processing time is not too long, and the vast majority or most of the microspheres are not broken, a good thermal insulation effect can be obtained. In addition, it needs to be stated that the SEM photo of product of embodiment 17 only illustrates the implementation process of the present disclosure, and cannot be understood as the limitation of the present invention. The size and shape of the microspheres in the final product may be changed by changing the material and composition of the microspheres, the heating temperature and time of the expansion process, and the proportion of each component and other factors.

Figure 8:
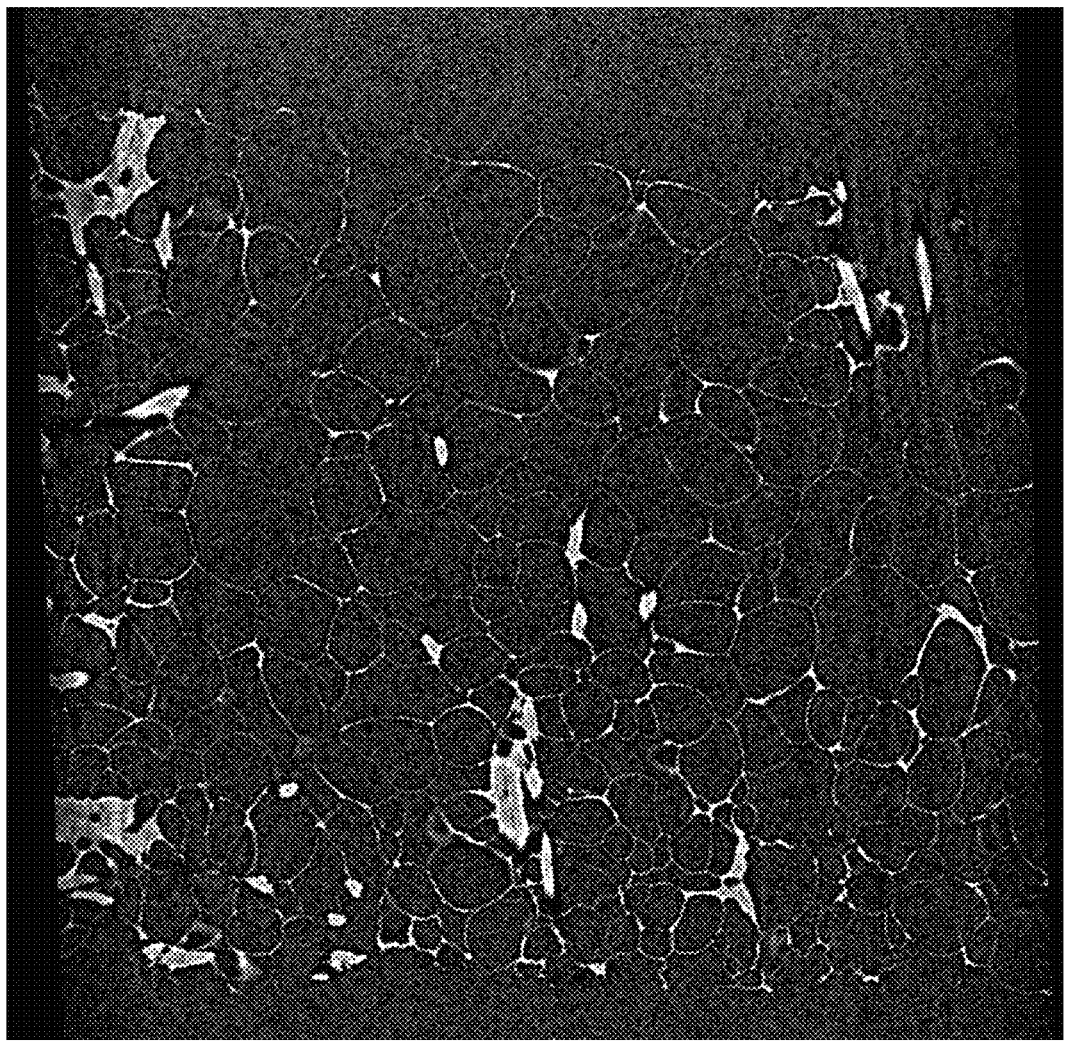
FIG. 8 is a computed tomography (CT) photo of the final product obtained in another embodiment of the present invention.
Figure 9:
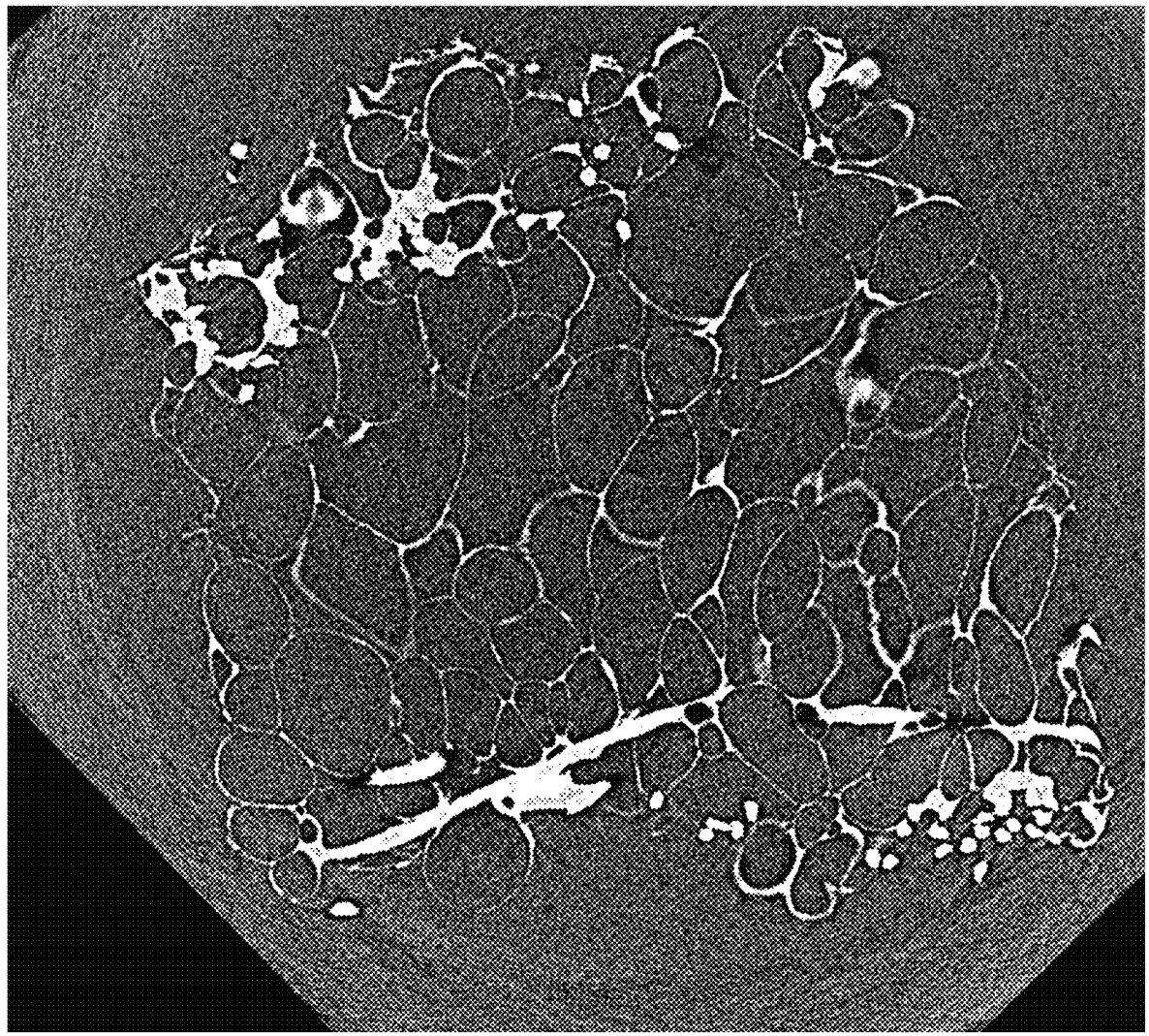
FIG. 9 is a computed tomography (CT) photo of a cross section of the final product obtained in another embodiment of the present invention.
Figure 10:
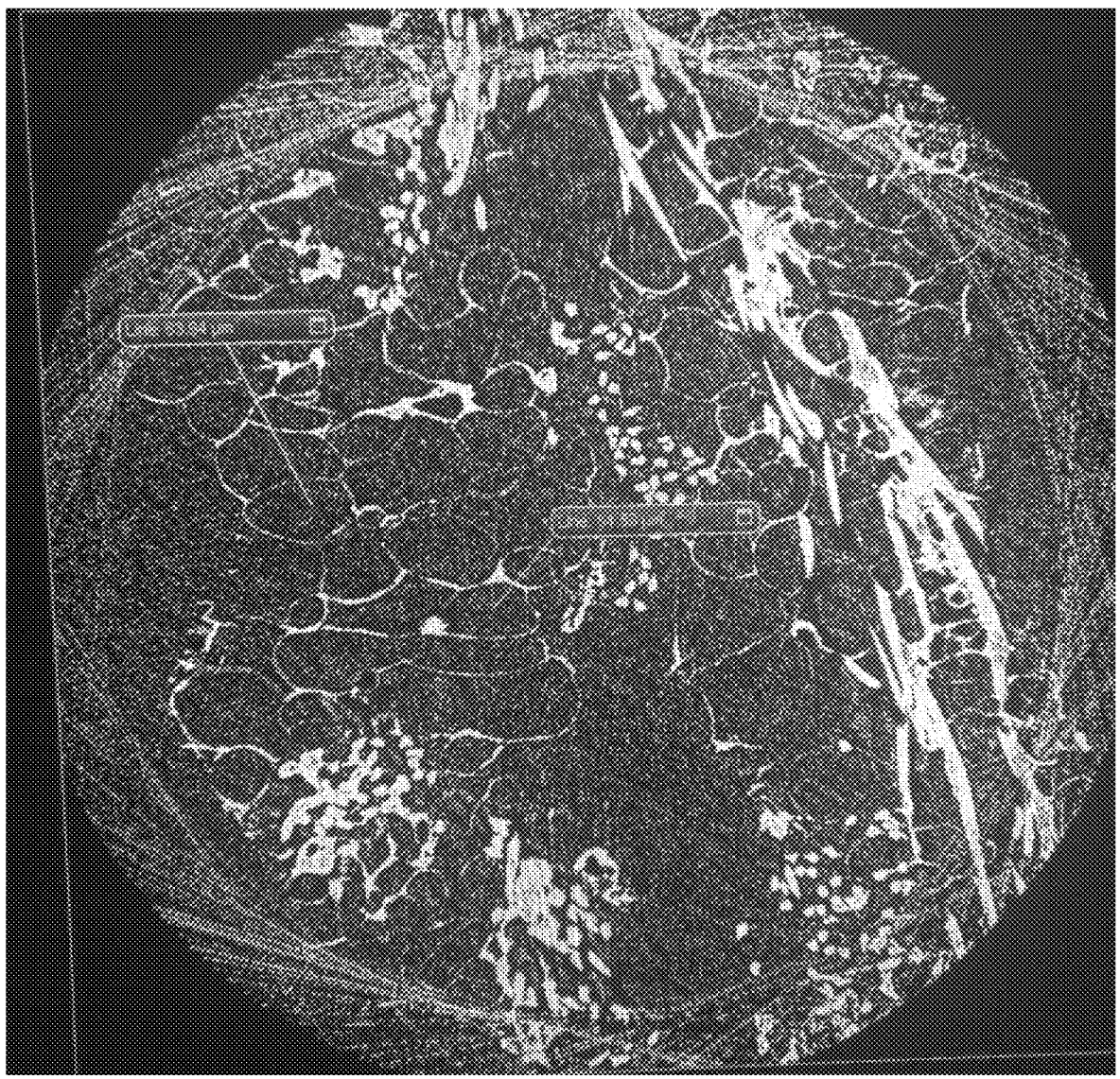
FIG. 10 is a computed tomography (CT) photo of a cross section of the final product obtained in another embodiment of the present invention.

As shown in FIG. 4 and FIG. 5, SEM photos can only show the surface morphology of the final product. If we want to investigate the internal structure of the final product, we have to cut the product, as shown in FIG. 6 and FIG. 7. It can be seen from FIG. 6 and FIG. 7 that a large number of microspheres are crowded together after expansion, almost occupying the whole space. The inner space of each microsphere is closed, so the gas inside the microspheres is not circulating. Because a large number of microspheres crowded together, the space between the microspheres is mostly closed, so in the final product, almost all gases are in the closed space and cannot flow freely, eliminating the heat loss caused by the heat conduction and air convection caused by air movement. However, there is a problem in observing the shape of the product after it is cut: the mechanical force during the cutting process will make the cross-section of the microspheres deform, so the shape of the microspheres in the cross-section changes compared with the shape of the microspheres in the actual product. In order to show the shape of the microspheres in the final product in normal state, the inventors further used the method of Computed Tomography (CT) to obtain the internal shape of the product in embodiment 17, as shown in FIGS. 8-10. FIG. 8, FIG. 9 and FIG. 10 are nondestructive testing for different positions of the product in embodiment 17, so they reflect the internal structure of the final product in its normal state. It can be seen from FIGS. 8-10 that most of the microspheres are ellipsoidal, and microspheres at the positions with severe extrusion are irregular, and almost all the spaces are filled with expanded microspheres. In FIG. 10, two expanded microspheres were selected and their sizes were accurately measured. The short axis sizes of the two microspheres were 63.94 μm (upper left) and 54.53 μm (middle position), respectively. The corresponding long axis size should be between 100 μm and 200 μm, and most of the microsphere sizes shown in FIG. 10 are of this magnitude. Of course, there are also some larger microsphere sizes of 300 μm-500 μm, and some smaller microsphere sizes of 20 μm-30 μm. It should be noted that if the size of the unexpanded thermo-expandable microspheres is different from that of Expancel 043DU80, the diameter of the microspheres after final expansion will be different.

Example 18 Multilayer Thermal Insulation Material Manufactured Through Multilayer Coating Process A base cloth with a thickness of 0.28 mm and a density of 68.5 g/m² is selected for the experiment. First, apply a layer of base coat on the base cloth, and then dry it below the expansion temperature of Expancel 043DU80, and then apply a layer of top coat on the dried base coat. The formula of the base coat and the top coat is as follows:

Proportion of Each Component in the Base Coat:
Water dispersing resin Impranil DLS 100
Thermo-expandable microspheres Expancel 043 DU 80 40
Deionized water 300
Defoamer BYK 093 0.3
Wetting agent BYK348 1.0
Thickener LYOPRINT PTF 1.0
Water-based color paste NV 6800 20
Proportion of Each Component in the Top Coat:
Water dispersing resin Impranil DLS 30
Water dispersing resin Impranil 1537 70
Thermo-expandable microspheres Expancel 043 DU 80 20
Deionized water 200
Defoamer BYK 093 0.3
Wetting agent BYK348 1.0
Thickener LYOPRINT PTF 0.5
Water-based color paste NV 6800 20

Referring to the operation mode of example 1, under the shear action of high-speed mixer, various components are added to the mixing kettle in turn according to the above formula, and all substances are fed and then stirred for 0.5-1 hour to obtain the base coat and the top coat respectively. Before coating, crosslinker can be added selectively.

The base coat is applied on a base cloth having a thickness of 0.28 mm and a density of 68.5 g/m². The amount of glue applied (wet weight) is 65±5 g/m². It is then baked in an oven under a temperature of 100° for one minute. After drying (to obtain the bottom insulation layer), apply the top coat on the base of the bottom insulation layer, the amount of glue applied (wet weight) is 130 g±5 g/m², and bake in an oven under 140° C. for 1 minute (to obtain the top insulation layer). A total thickness of the base cloth and the coating layer is 0.9 mm, the temperature difference is 10.5° C., the coating rub fastness is very good. The coating thickness and clo value can be increased by two coating construction. Because the coating rub fastness mainly depends on the top coat, requirements of the rub fastness of the base coat can be lowered, and the main consideration is to improve its thermal insulation performance. Therefore, the amount of thermo-expandable microspheres can be increased in the base coat or different specifications of thermo-expandable microspheres can be used, and it is possible to use only one kind of water dispersing resin.

The preparation process of the mixed material in examples 19-24 is the same as that of example 1, but the coating equipment of examples 19-24 is completely different from the previous equipment and is similarly to industrial production line. Clo value of the coating sample is tested (The National Textile Quality Supervision and Inspection Center requires a sample size of 60 cm*60 cm for the clo value test). The formulations of examples 19-24 are listed in the following table:

TABLE 5

Formula (unit: gram) and performance characterization of examples 19-24

| | Example | | | | | |
| --- | --- | --- | --- | --- | --- | --- |
| | 19 | 20 | 21 | 22 | 23 | 24 |
| Impranil DLS | 30 | 30 | 30 | 30 | 30 | 30 |
| Impranil 1537 | 70 | 70 | 70 | 70 | 70 | 70 |

TABLE 5-continued

Formula (unit: gram) and performance characterization of examples 19-24

|  | Example | | | | | |
| --- | --- | --- | --- | --- | --- | --- |
|  | 19 | 20 | 21 | 22 | 23 | 24 |
| Expancel 043 DU 80 | 20 | 20 | 20 | 20 | 30 | 30 |
| Deionized water | 200 | 200 | 200 | 200 | 200 | 200 |
| BYK 093 | 0.3 | 0.3 | 0.3 | 0.3 | 0.3 | 0.3 |
| BYK 348 | 1 | 1 | 1 | 1 | 1 | 1 |
| LYOPRINT PTF | 0.5 | 0.5 | 0.5 | 0.5 | 0.5 | 0.5 |
| NV 6800 | 20 | 20 | 20 | 20 | 20 | 20 |
| Coating amount (dry weight) | 6.05 g/m$^2$ | 16.15 g/m$^2$ | 16.5 g/m$^2$ | 23.3 g/m$^2$ | 25 g/m$^2$ | 25.7 g/m$^2$ |
| Baking temperature | 150° C. | 150° C. | 150° C. | 160° C. | 150° C. | 160° C. |
| Wind amount | 70% | 70% | 50% | 70% | 70% | 70% |
| Baking time | 1 min | 1 min | 1 min | 1 min | 1 min | 1 min |
| Coating sample thickness | 0.22 mm | 0.37 mm | 0.31 mm | 0.32 mm | 0.27 mm | 0.37 mm |
| Thickness of base cloth | 0.28 mm | 0.28 mm | 0.28 mm | 0.28 mm | 0.28 mm | 0.28 mm |
| Clo value[1] | 0.208 | 0.453 | 0.302 | 0.36 | 0.40 | 0.508 |
| Coating strength | good | good | good | good | good | good |
| Normalized clo value[2] | 0.95 | 1.22 | 0.97 | 1.13 | 1.48 | 1.37 |
| Surface density of base cloth (g/m$^2$) | 68.5 | 68.5 | 68.5 | 68.5 | 68.5 | 68.5 |
| Coating density[3] (kg/m$^3$) | 27.5 | 43.6 | 53.2 | 64.7 | 80.6 | 62.7 |

Note[1]:
The clo value test of examples 19-24 is provided by China National Textile Products Quality Supervision and Inspection Center. Report NO. of example 19: BA18001207-3; report NO. of example 20: BA18001207-1; report NO. of example 21: BA18001207-2; report NO. of example 22: BA18001308-3; report NO. of example 23: BA18001308-1; report NO. of example 24: BA18001308-2.

Note[2]:
Because the clo value is approximately proportional to the thickness of the coating sample, the "normalized clo value" is calculated by normalizing the thickness of the coating sample to 1 mm.

Note[3]:
The calculation method of coating density is to subtract the weight of the base cloth from the total mass of products including the base cloth and the coating to obtain the coating mass; subtract the volume of the base cloth from the total volume of products including the base cloth and the coating to obtain the coating volume; divide the coating mass by the coating volume to obtain the coating density.

The difference between the laboratory small sample coating and the approximate line coating equipment is as follows: the laboratory small sample coating can only be applied to an area of the size of A4 paper, the baking is a box oven. The approximate line (also known as "pilot") oven can be blown up and down; the approximate line is continuous production, the tension and coating amount is more uniformly controlled, and the sample size produced is large enough to conduct thermal resistance testing by professional instruments. The approximate production line test is designed to verify the performance of the technical solutions of present disclosure in the actual production of the product and to better reflect the practical application value of technical solutions of present disclosure.

The performance of the formulation in approximate line testing is verified, and the rub fastness and experimental conditions are different; even at 150° C., the airflow is different (the heating principle of the approximate line is to use a fan, which blows hot air heated by high heat steam or thermal oil onto the surface of the sample to heat the coating, so at the same temperature the airflow is directly related to the heating energy, which in turn affects the microsphere foaming and therefore the clo value. Usually the higher the heating energy is, the better the expansion and the greater the do value will be; however, too much heating energy will cause the microsphere to over-expand, resulting in rupture and a lower clo value). As long as the expansion limit set by the thermal expansion microsphere is not exceeded, the greater the air volume and thickness is, the better the thermal resistance will be. The highest clo values were obtained at 70% airflow and a baking temperature of 160° C.; however, at temperatures above 160° C., the coating sample thickness no longer increased and the thermal resistance decreased (suggesting that microspheres were over-expanded, which could cause some microspheres to rupture and affect thermal resistance instead).

A comparative analysis of the results of the above examples shows the following results.

Comparing example 19 and example 20, as can be seen from Table 5, the reactant formulations, baking conditions, etc. of example 19 and example 20 are the same, the difference being that the coating amount (dry weight) of example 19 is 6.05 g/m$^2$ while the coating amount (dry weight) of example 20 is 16.15 g/m$^2$ and ultimately results in a difference in coating sample thickness. Example 20 has a larger coating volume (dry weight), so the coating sample is thicker and has a higher do value. Under the same formulation and baking conditions, the higher the amount of coating (dry weight), the higher the water dispersion resin content and the higher the water content; since the volatilization of water and the expansion of microspheres are both heat-absorbing processes, under the same baking conditions, the weaker the expansion capacity of microspheres and the higher the density, so that the foaming in example 19 is more adequate and the density is lower, and the density in example 20 is higher.

Comparing example 20 and example 21. The experimental conditions of example 20 and example 21 are same except for the baking conditions. Example 20 is baked at 150° C. for 1 minute at 70% of the up and down air supply; example 21 is baked at 150° C. for 1 minute at 50% of the up and down air supply; the higher the air supply, the more adequate the foaming. In terms of the thickness of the coated dry film and the clo value of the sample, the higher thickness, clo value and normalized clo value of the coated sample of example 20 indicate that it has better baking conditions. Other conditions being same, the better the baking conditions, the more adequate the expansion of the microsphere, so that the coating density of example 20 is less than the coating density of example 21. It should be noted that there is a small difference in the amount of coating (dry weight) between example 20 and example 21 because even if the formulation and coating conditions are guaranteed to be identical, there will be a small difference in the amount of coating (dry weight) ultimately applied to the substrate, but this difference will have a negligible effect on the thermal insulation properties of the product (e.g. the difference in the coating amount (dry weight) between embodiment 20 and embodiment 21 is only 2%). The same situation can be seen in examples 23 and 24.

Comparing example 20 with example 22. Example 20 has a coating amount (dry weight) of 16.15 g/m², baking temperature 150° C., 70% up and down air supply, baking time 1 min; example 22 has a coating amount (dry weight) of 23.3 g/m², baking temperature 160° C., 70% up and down air supply, baking time 1 min; other conditions are the same. Due to the larger coating amount (dry weight) of example 22, it is generally expected that example 22 has better thermal insulation performance and has a higher clo value. However, comparing the coating sample thickness and the do values of the two examples, it can be found that the coating sample thickness and the do values of example 20 are significantly higher. The main reason is that the baking temperature of example 22 is too high, which leads to a higher number of microspheres breaking in the final product, which reduces the thickness of the dry film of the coating and reduces the thermal insulation effect. The coating amount (dry weight) in example 22 increases, and the microspheres in the middle of the coating have increased expansion resistance and insufficient expansion; at the same time, the outer microspheres break due to high temperature, so example 22 is denser than 20, and the thermal insulation effect decreases.

Comparing example 20 with example 23. Example 23 has 50% more microspheres content and 55% more coating amount (dry weight) than example 20, but the thickness of the coating sample in example 23 and the do value are lower than example 20. In the case where the amount of expanded microsphere is greater and the coating amount (dry weight) is greater, the thermal insulation effect of example 23 is not better than example 20 due to insufficient expansion of the microspheres in the product of example 23. Since the volatilization of water during baking, the heating of the mixture and the expansion of the microspheres are all heat-absorbing processes, the baking strength is not increased accordingly when the coating amount (dry weight) is increased, resulting in inadequate expansion of the microspheres in the final product of example 23, and the thickness of the dry film of the coating and the clo value are not high.

Comparing example 23 and example 24. The difference between example 23 and example 24 is that the baking temperature of example 24 is 10° C. higher than that of example 23. A comparison between example 20 and example 23 shows that example 23 is insufficiently baked and therefore example 24 has a higher coating sample thickness and do values (including normalized do values) after increasing the baking temperature, indicating that the baking conditions of example 24 are better under the same formulation.

At the same formulation, the coating density reflects the actual level of expansion of the microspheres. The lower the density, the better of microspheres expansion, and thus the higher the normalized do value can be expected. Comparing examples 20 and 21, 20 and 22, 23 and 24, will be found to comply with this law. However, example 19 appears to break this law because the coating amount (dry weight) in example 19 is so small that the coating sample thickness is too thin, and the instrument tests with microporous penetrations in the film layer causing air convection (and therefore heat loss), so the exception in example 19 cannot be considered to break the aforementioned law.

Figure 11:
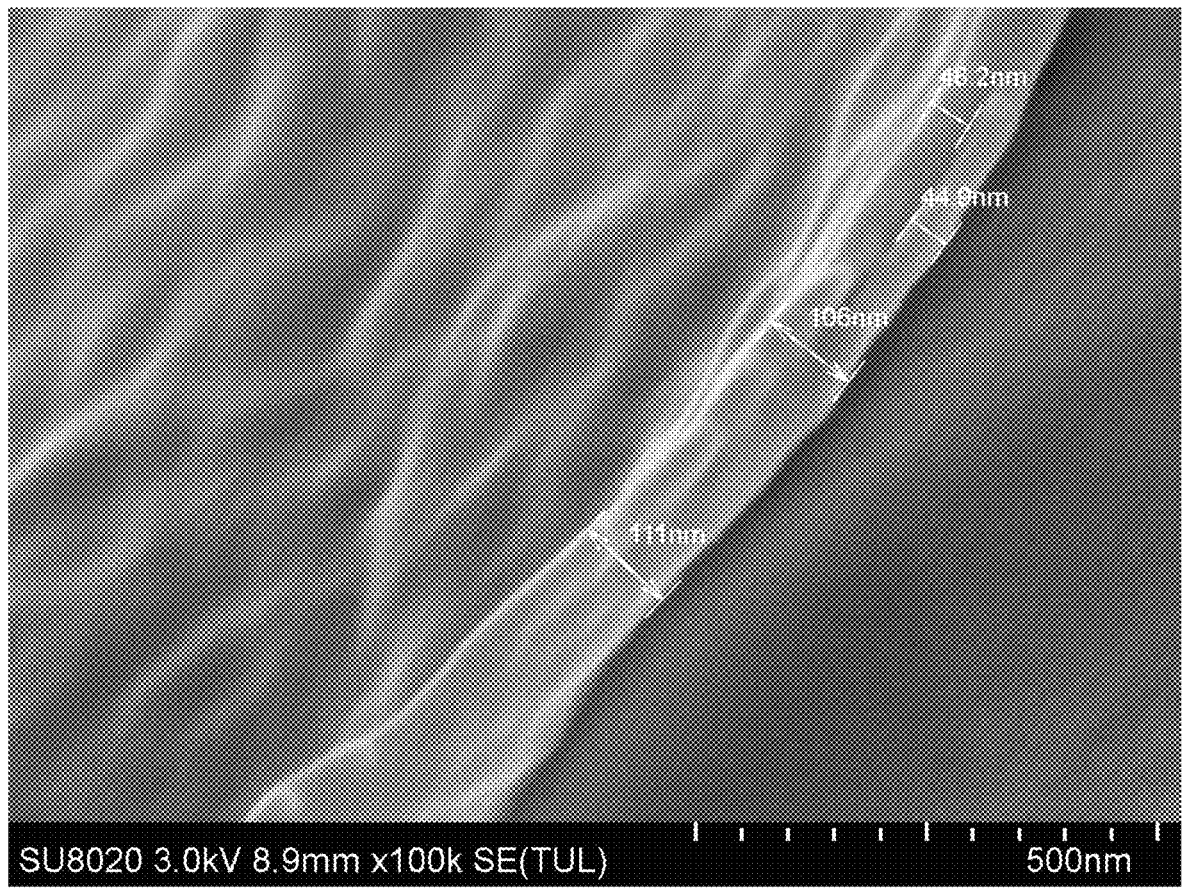
FIG. 11 to FIG. 17 are scanning electron microscope (SEM) photos which show thicknesses of walls of the microspheres in the final product obtained in embodiments of the present invention.
Figure 12:
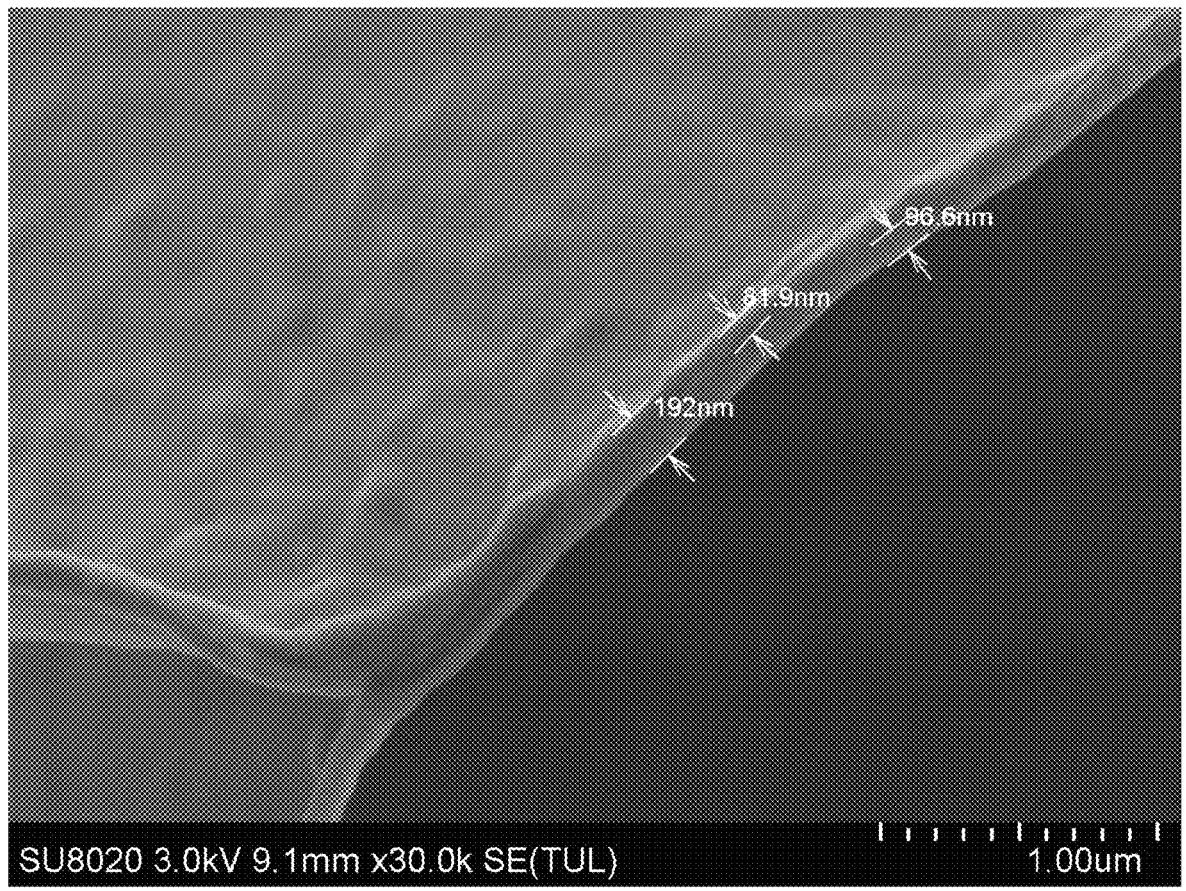
Figure 13:
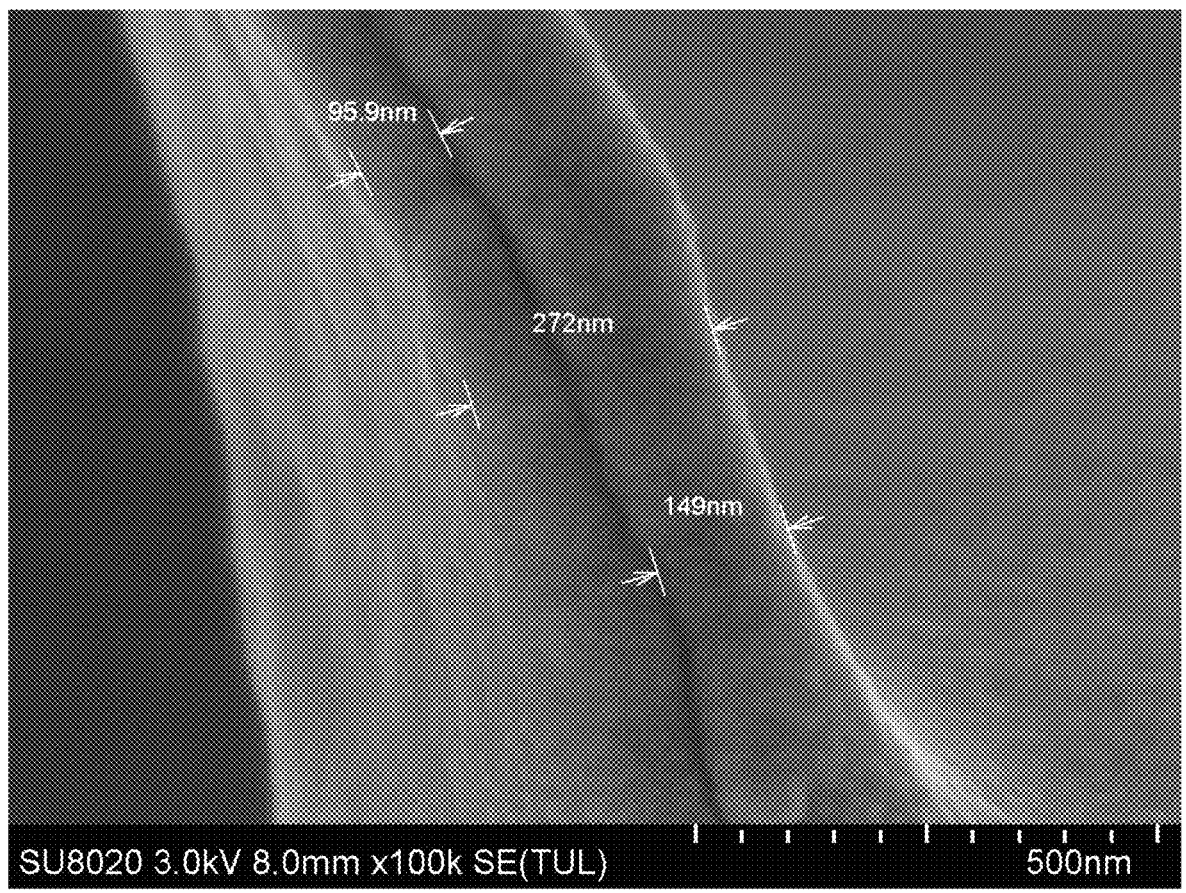
Figure 14:
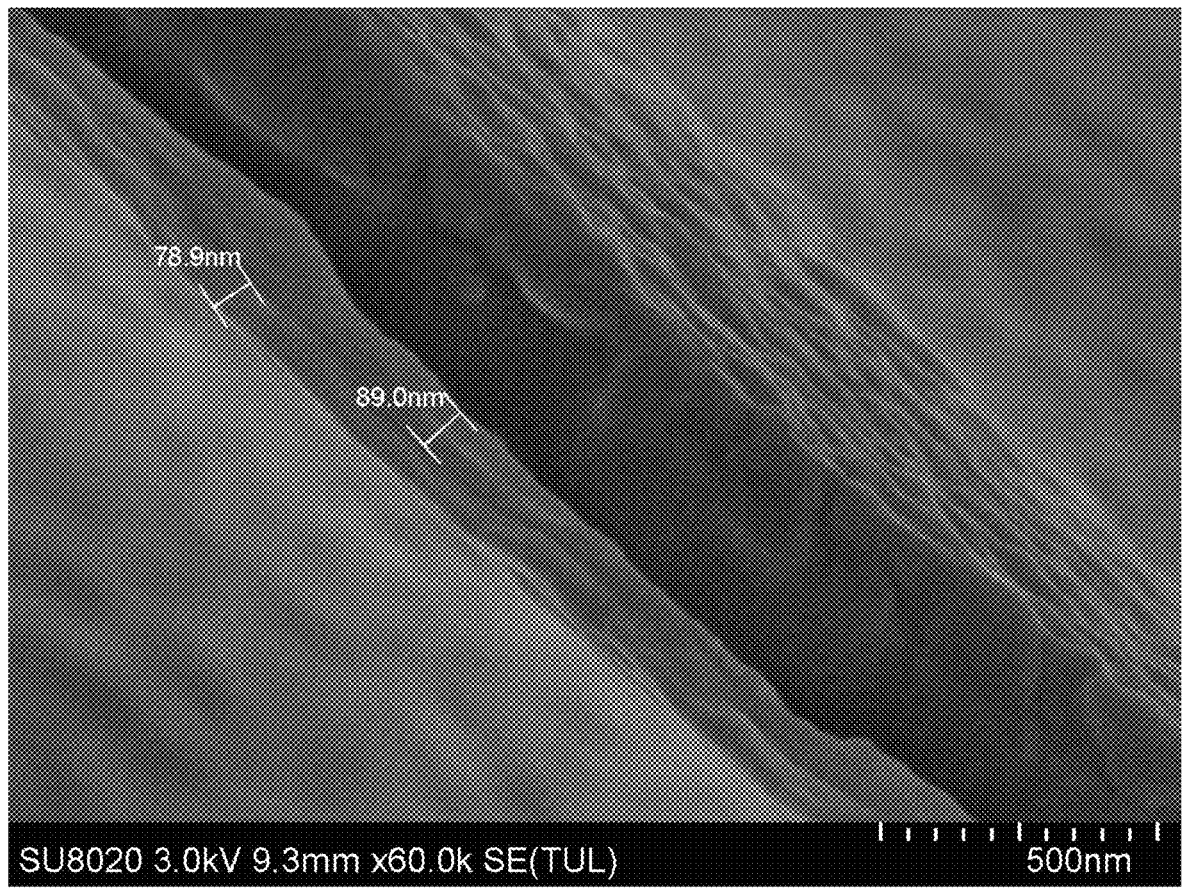
Figure 15:
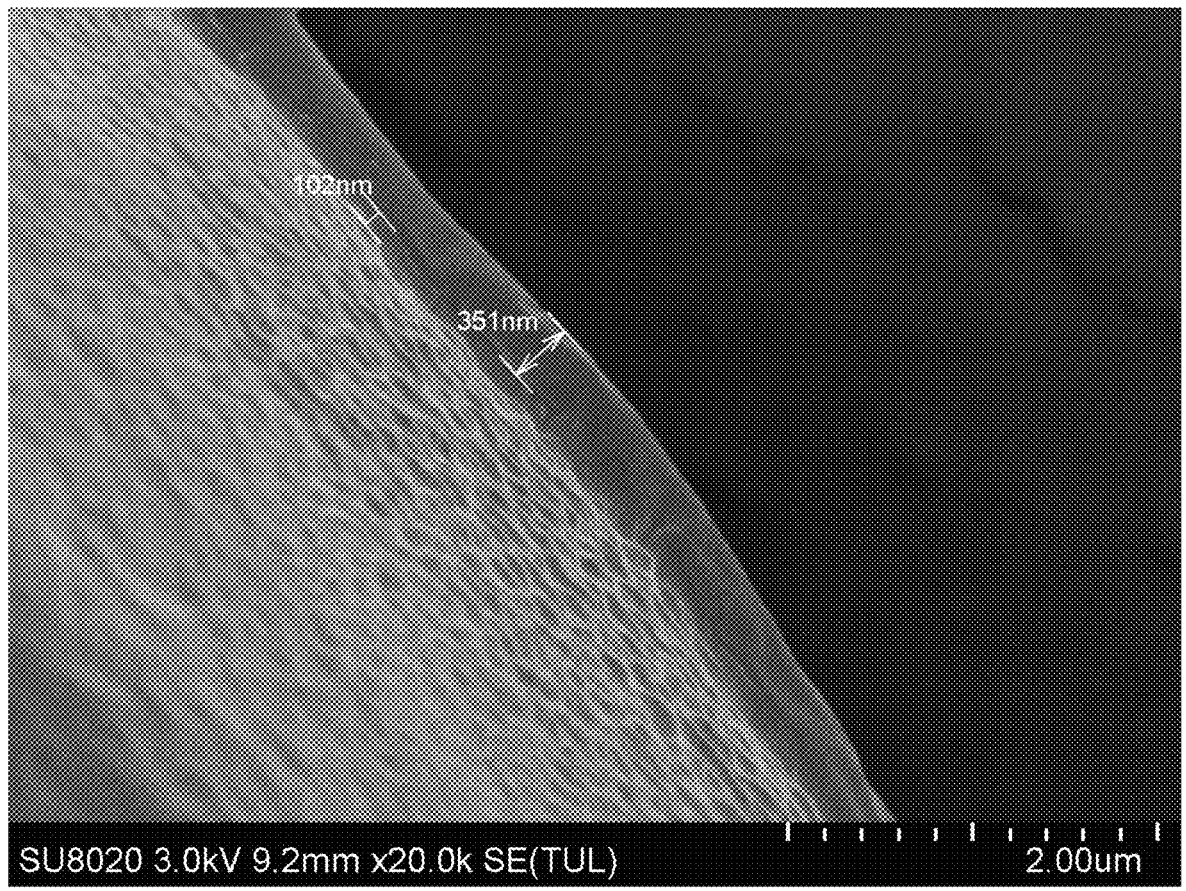
Figure 16:
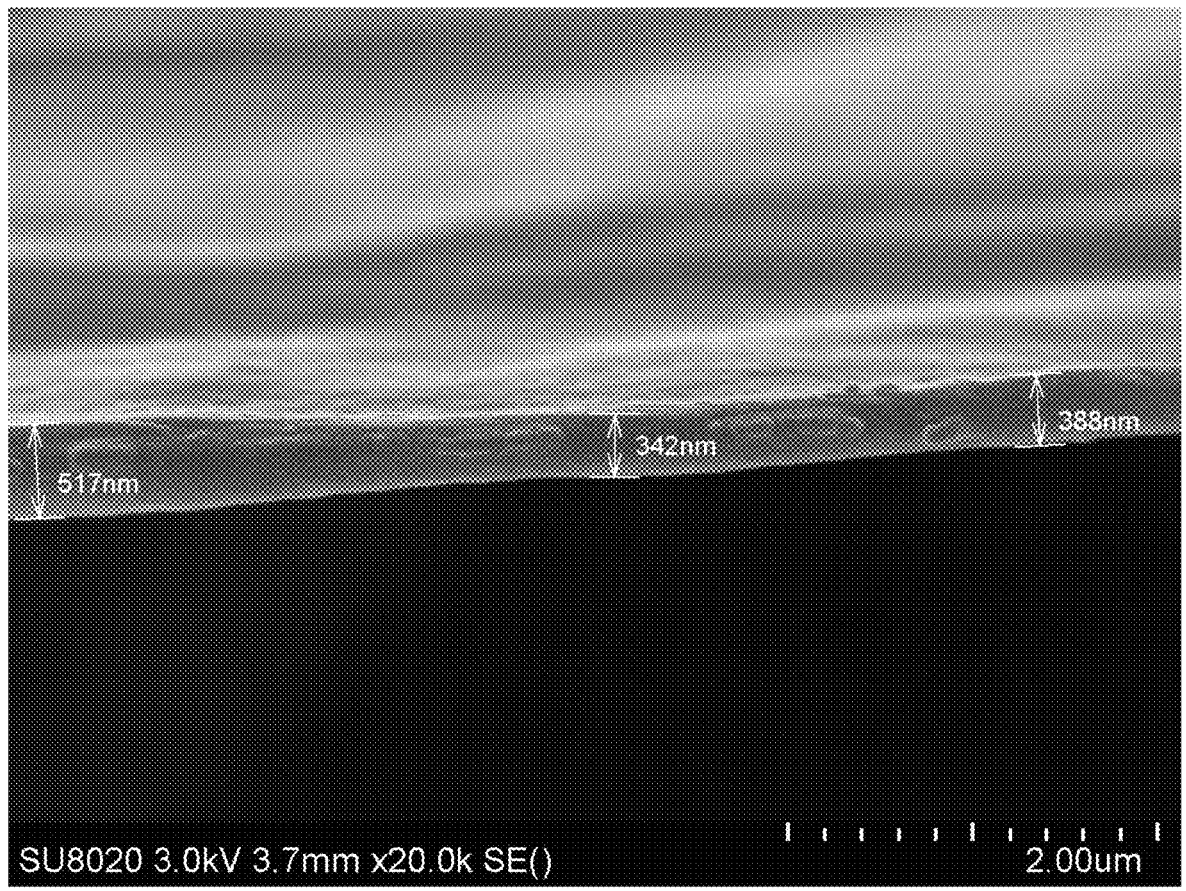
Figure 17:
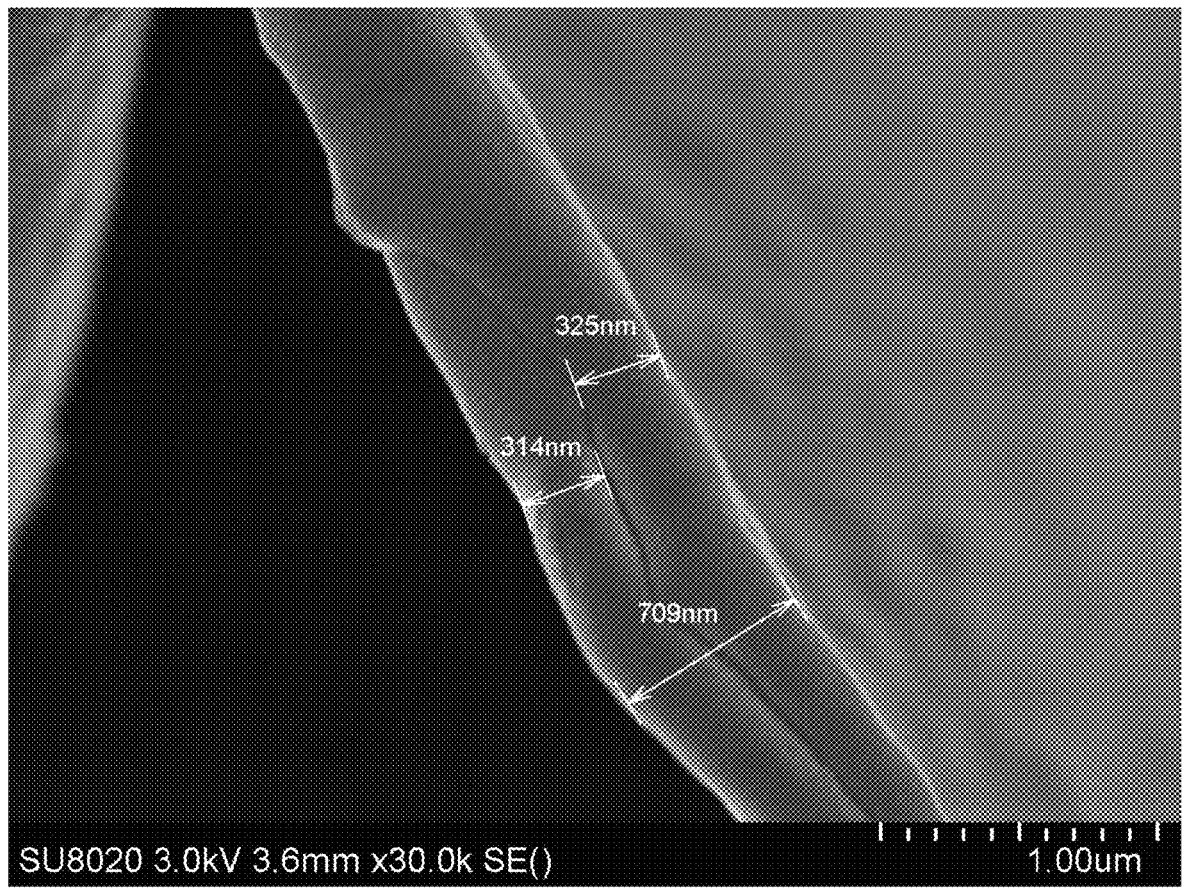

In order to determine the ratio of the total volume of the closed cavity to the total volume of the polymer wall in the final product, it is necessary to know, in addition to the diameter of the microspheres, the range of thicknesses of the microsphere walls. FIG. 11-FIG. 17 show wall thicknesses of the microspheres as measured by SEM, wherein FIG. 11 is from example 19, FIG. 12-FIG. 13 is from example 25, FIG. 14-FIG. 15 is from example 24, and FIG. 16-FIG. 17 is from example 21. As can be seen from the previous FIG. 3-FIG. 10, different microsphere sizes in the final product vary greatly because the level of expansion of different microspheres is affected by many factors, including the thickness of the polymer of the microsphere shell, the amount of thermal expansion substance encapsulated inside the microspheres, etc. Due to the different level of microsphere expansion, it can be expected that different microsphere wall thicknesses in the final product will vary, as confirmed by the results in FIGS. 11-17. For example, FIGS. 16 and 17 are from observations of the products in example 21, but wall thicknesses vary from more than 300 nm to more than 700 nm, but it appears from the observations that the wall thickness of fully foamed products is generally smaller than that of insufficiently foamed products. It is also easy to understand that the fuller the microsphere expansion, the thinner its walls will be. Since the average wall thickness of the expanded microspheres in the final product cannot be accurately obtained under current conditions, FIG. 11-FIG. 17 will help us determine the range of wall thickness distribution. Using FIG. 13 as an example, it is apparent that the polymer wall is divided into two layers, separated by a black line in the middle. The walls on each side come from two expanded microspheres that are adjacent and in contact, while the dark region in the middle comes from a water dispersing resin. "Thickness of the polymer wall" as stated in the claims means the total thickness of the polymer wall including two adjacent layers of microspheres and the water dispersion resin layer in between. In fact, as an thermal insulating material, the three-layered structure of the polymer wall can be treated as a whole without any distinction, since, on the one hand, the three polymer layers are actually fused together during the heating process and, on the other hand, the thermal conductivity of the polymers, whether from microspheres or from water dispersing resins, differs insignificantly and is considerably greater than that of air, so that it is technically reasonable to treat the three-layered structure of the polymer wall as a whole. In order to obtain optimal thermal insulation, the inventors of the present invention have found it necessary to ensure, on the one hand, that the space inside the enclosed porous composite is as enclosed as possible and, on the other hand, to minimize the amount of polymer, whether the polymer is from a thermally expanding microsphere or from a water dispersing resin. Accordingly, the polymer wall of the three layered structure described above should not be construed as a limitation on the present disclosure, and a variety of methods may be used to achieve both of these objectives (maximum amount of enclosed space and minimum amount of polymer), provided that they are achieved. For example, a thermally expanded microsphere that is inherently sticky is used, so that a water dispersion resin can be omitted and only two layers of polymer from adjacent microspheres are present in the final product. Notwithstanding this (it is not technically necessary to distinguish between the internal structure of the polymer wall described above), in order to determine the ratio of the total volume of the closed cavity to the total volume of the polymer wall in the final product, it is necessary to know the range of thicknesses of the individual expanded microsphere walls (i.e., the thickness of the walls on both sides separated by the middle black line, for example, in FIG. 13; whereas the middle black line is so thin that it actually incorporates the water dispersing resin represented by the black line into the microsphere walls on both sides). The individual microsphere wall thickness dimensions obtained from FIGS. 11-17 include: 44.9 nm, 48.2 nm, 81.9 nm, 96.6 nm, 95.9 nm, 149 nm, 78.9 nm, 89 nm, 102 nm, 351 nm (the boundary between the two layers of microsphere walls in FIG. 16 is not obvious), 314 nm, and 325 nm. As shown in FIGS. 8 and 9, most of the microspheres are in contact with each other after expansion and many intersections are shown on the plan view. In FIGS. 11-17, the microsphere wall thickness dimensions were all chosen to be measured at the middle position away from the above intersection.

Assuming that the thermally expanded microspheres are regular spheres with a diameter of 100 μm (most of the expanded microspheres observed in the examples are around 100 μm in diameter), if the average wall thickness of a single microsphere is 5 the proportion of the volume of the closed cavity and the volume of the wall in the final product can be calculated as follows: the surface area of a single sphere $S=4\pi r^2=4*3.14*50*50=31,400$, so that the volume of a single sphere wall is $V_{wall}=S*h$ (thickness)$=157,000$ μm$^3$. The volume of the cavity in the microsphere is $V_{cavity}=\pi r^3*4/3=3.14*50*50*50*4/3=523333$ μm$^3$. Then a ratio of cavity volume to wall volume is $V_{cavity}$: $V_{wall}=523333/157000=3.33$. The above ratio is 16.67 if the average wall thickness is 1 μm, 33.3 if the average wall thickness is 0.5 μm, 83.3 if the average wall thickness is 0.2 μm, 166.7 if the average wall thickness is 0.1 μm, 333.3 if the average wall thickness is 0.05 μm, 416.7 if the average wall thickness is 0.04 μm, 555.6 if the average wall thickness is 0.03 μm, 833.3 if the average wall thickness is 0.02 μm, 1666.7 if the average wall thickness is 0.01 μm. It should be noted that the above calculations do not take into account the volume of space between the microspheres, so in practice the ratio of the total volume of the insulation cavity to the total volume of polymer walls will be greater than the above estimates. Furthermore, from the wall thickness data measured in the examples of the present invention, the average wall thickness of 0.01 μm is close to the limit of microsphere expansion used in the experiments of the present invention, and thus the ratio of cavity volume to wall volume 1666.7 is also close to the upper limit. Based on the above calculations, it is inferred that the ratio of the cavity volume to the wall volume of the examples of the present invention is less than 2000, but if other microspheres with larger expansion multiples are used, the ratio of the cavity volume to the wall volume may exceed 2000.

Example 25 Manufacture of Multi-Layered Thermal Insulation Material by Multi-Layer Coating Process—Production Line Testing The implementation approach references example 18, but scales up manufacturing to test the performance of the present disclosure scheme in actual large-scale production. Using a base cloth with a thickness of 0.15 mm and a unit weight of 33.3 g/m$^2$, the base cloth was first coated with a layer of the base coat, the temperature and baking time were set for drying at a temperature where Expancel 043 DU80 unexpanded microspheres failed to expand, and then a layer of top coat was applied over the dried base coat. The formulations of the base coat and top coat are as follows.

Proportion of Each Component in the Base Coat:
Water dispersing resin Impranil DLS 100
Thermo-expandable microspheres Expancel 043 DU 80 40
Deionized water 300
Defoamer BYK 093 0.3
Wetting agent BYK348 1.0
Thickener LYOPRINT PTF 1.0
Water-based color paste NV 6800 20
Proportion of Each Component in the Top Coat:
Water dispersing resin Impranil DLS 30
Water dispersing resin Impranil 1537 70
Thermo-expandable microspheres Expancel 043 DU 80 20
Deionized water 200
Defoamer BYK 093 0.3
Wetting agent BYK348 1.0
Thickener LYOPRINT PTF 0.5
Water-based color paste NV 6800 20

Referring to the operation method of Example 1, under the shearing action of a high-speed mixer, various ingredients are added to the mixing kettle according to the above formula, and all substances are fed and stirred for 0.5 to 1 hour. Crosslinker may be added selectively prior to construction.

The base coat formulation was applied on a 0.15 mm thick base cloth with 65±5 g/m$^2$ of glue (wet weight) and baked in an oven at 100° C. for 1 min. After drying, the top coat is applied on top of the base coat, the amount of glue (wet weight) is 130±5 g/m$^2$, and it is baked in an oven at 150° C. for 1 minute. A total thickness of the base cloth and coating samples is 0.55 mm-0.6 mm (resulting in a coating thickness of 0.40 mm-0.45 mm), with a do value of 0.605 (a normalized clo value of 1.34-1.51 converted to 1 mm coating thickness), good coating rub fastness and strong coating surface. A density of the thermal insulating coating for this group of experiments was 75.6 kg/m$^3$. The two-coating process can increase the coating thickness and the clo value, but it is less than the thickness superimposed when the two coats are applied separately; the coating rub fastness is mainly dependent on the top coat. Since the rub fastness of the coating depends mainly on the top coat, the rub fastness requirement of the base coat can be reduced and the main consideration is to improve thermal insulation performance, so that the amount of thermo-expandable microspheres in the base coat can be increased and only one water dispersing resin can be used. The two-coating process has a certain influence on the expansion capacity of microspheres in base coat due to the increase in binding force of the resin, and the thermal resistance is better when the microsphere content and coating amount are increased. Note: This do value data is provided by a third party: Jingjianyihe (Beijing) Product Quality Supervision and Testing Center, test number: NB201805006.

In practical applications, a plurality of closed porous composites may be bonded together into a single unit with an adhesive, or one or more closed porous composites may be bonded together with other materials into a single unit with an adhesive. For example, a product made from two layers of example 25 is bonded together "face to face" (i.e., one coating facing another coating) with an adhesive to obtain a "sandwich" structure with two outer layers of a substrate and an intermediate layer of a closed porous material (insulation) (it is also possible to laminate by bonding the carrier face to the carrier face). The adhesive was bonded using a hot melt adhesive laminator manufactured by Wuxi Nuoerte Machinery Co., Ltd. and the adhesive used was PUR reactive hot melt adhesive with a dry weight of 15 g/m². The total thickness of the "sandwich" structure is 1.21 mm and the do value is 1.11. The clo value increases after the double-layer lamination, indicating that the increased thickness of the double-layer lamination results in improved thermal insulation properties. Closed porous composites can also be bonded to other materials, expanding the applications of closed porous composites. Note: This do value data is provided by Jingjianyihe (Beijing) Product Quality Supervision and Testing Center, test number: NB 201805004.

The enclosed porous composites of the present disclosure can be used as sound absorbing or soundproof materials. The difference between sound absorbing material and soundproof material is that sound absorption material focuses on the magnitude of the reflected sound energy on the source side, with the goal of having less reflected sound energy. Soundproof material focuses on the magnitude of the transmitted sound energy on the other side of the incident sound source, with the goal that the transmitted sound energy is small. The attenuation of the incident sound energy absorption of a sound absorbing materials is generally only a few tenths, therefore, its sound absorption capacity, i.e., the sound absorption coefficient can be expressed in decimal; and soundproof materials can make the transmitted sound energy attenuation to the incident sound energy of $10^{-3}$-$10^{-4}$ or smaller, for ease of expression, decibels is used to describe the soundproof amount.

The difference between the two materials is that the sound absorbing material reflects very little of the incident sound energy, which means that sound energy can easily enter and pass through this material. It is conceivable that the material should be porous, loose and breathable, which is typical of the porous sound absorbing material, which is usually fibrous, granular or foam material to form a porous structure; its structural characteristics are: this material has a large number of interconnected microporous distributing from the surface to the inside, that is, has a certain degree of breathability. When sound waves are incident on the surface of the porous material, causing air vibration in the microporous, due to the frictional resistance and the viscous resistance of the air and heat transfer, a considerable part of the acoustic energy are converted into thermal energy, thus acting as sound absorption.

In the case of soundproof materials, to reduce the transmission of sound energy, blocking the spread of sound, they cannot be as porous, loose, breathable as sound absorbing materials. Instead they should be made of heavy and dense materials such as steel plates, lead boards, brick walls, etc. The soundproof material is required to be dense without holes or gaps; to have a large weight. Because of the dense texture of this type of soundproof material, it is difficult to absorb and transmit sound energy, resulting in strong reflective energy, so it has poor sound absorption performance.

Based on the above analysis, it can be seen that the closed porous composite material of present disclosure combines the structural characteristics of the above soundproof and sound absorbing material, which includes porosity and overall sheet. Therefore, the closed porous composite material of present disclosure has both soundproof and sound absorption performance.

Examples 26-31 Effects of Different Addition Amounts of Microsphere on Thermal Conductivity

TABLE 6

| Formula (unit: gram) and performance characterization of examples 26-31 | | | | | | |
|---|---|---|---|---|---|---|
| | Example | | | | | |
| | 26 | 27 | 28 | 29 | 30 | 31 |
| Impranil DLS | 30 | 30 | 30 | 30 | 30 | 30 |
| Impranil 1537 | 70 | 70 | 70 | 70 | 70 | 70 |
| Expancel 043 DU 80 | 30 | 20 | 15 | 10 | 5 | 0 |
| Deionized water | 100 | 100 | 100 | 100 | 100 | 100 |
| Polyether siloxane copolymer emulsions (defoamer) | 0.2 | 0.2 | 0.2 | 0.2 | 0.2 | 0.2 |
| Polyether-modified polydimethylsiloxane (wetting leveling agent) | 0.5 | 0.5 | 0.5 | 0.5 | 0.5 | 0.5 |
| Acrylic polymer (thickener) | 0.2 | 0.2 | 0.2 | 0.2 | 0.2 | 0.2 |
| Coating amount (wet weight) | 50 ± 5 g/m² | 50 ± 5 g/m² | 50 ± 5 g/m² | 50 ± 5 g/m² | 50 ± 5 g/m² | 50 ± 5 g/m² |

TABLE 6-continued

Formula (unit: gram) and performance characterization of examples 26-31

| | Example | | | | | |
|---|---|---|---|---|---|---|
| | 26 | 27 | 28 | 29 | 30 | 31 |
| Baking conditions | 1 minute under 140° C. | 1 minute under 140° C. | 1 minute under 140° C. | 1 minute under 140° C. | 1 minute under 140° C. | 1 minute under 140° C. |
| Base cloth thickness (mm) | 0.15 | 0.15 | 0.15 | 0.15 | 0.15 | 0.15 |
| Coating sample thickness-including base cloth (mm) | 0.8 | 0.65 | 0.5 | 0.4 | 0.3 | 0.15 |
| Thermal conductivity (w/m · k) | 0.0158 | 0.016 | 0.0192 | 0.0208 | 0.0289 | 0.2093 |

The test method of thermal conductivity is the Hot disk transient planar heat source method and the thermal conductivity test conditions are:
  Equipment model: TPS3500
  Test module: Basic module, one-sided method
  Probe type: Kapton 7577
  Heating power: 10 mw
  Test time: is
  Ambient temperature: 26±0.5° C.
  Lower background material: quartz
  Upper background material: polystyrene foam
  The results of the above tests are analyzed as follows.

The sample of Example 31 is a conventional polyurethane coating, no thermo-expandable microspheres are added to the composite, the coating thickness is only related to the amount of coating, and since the amount of 50 g/m² wet coating is a small value, the final dry coating is very thin and the total thickness of the measured coating sample containing the base cloth is almost equal to the thickness of the base cloth itself. Since both the base cloth and the polyurethane coated film are solid polymer materials, the thermal conductivity is high at 0.2093 w/m·k.

When thermo-expandable microspheres are added to the formulation, the thermo-expandable microspheres expand after being heated, so the coating thickness increases significantly, and increases with the increase of the amount of microspheres added (examples 26-30); another result of adding microspheres is that the coating film produces a large number of closed pores, which can effectively reduce the thermal conductivity of the coating film (examples 26-30); but when the amount of microspheres added increasing to a certain degree, the microspheres squeezed each other in foaming process, competing to absorb energy during baking. Therefore, the microspheres cannot be fully expanded, and the thermal conductivity cannot be further reduced. The lowest thermal conductivity is reached when thermo-expandable microspheres are added at 20-30 weight parts.

The above contents are only exemplary embodiments of the present invention and is not intended to limit the protection scope of the present invention. The protection scope of the present invention is determined by the appended claims.

The present application claims priority to Chinese Patent Application No. 201811051379.3, filed on Sep. 10, 2018, and the above Chinese Patent Application disclosure is hereby incorporated by reference in its entirety as part of this application.

The invention claimed is:

1. A closed porous composite material, comprising a plurality of closed cavities each enclosed in one of a plurality of polymer walls,
  wherein a size range of the plurality of closed cavities is from 20 μm to 800 μm,
  and a ratio of a total volume of the plurality of closed cavities to a total volume of the plurality of polymer walls is greater than 16,
  and a thickness of the polymer walls is from 0.01 μm to 5 μm,
  wherein each polymer wall comprises a thermoplastic or thermosetting polymer on a first side facing an interior of the closed cavity that the polymer wall encloses and a water dispersing resin away from the first side, and
  a thermal conductivity of the closed porous composite material is less than 0.030 w/m.k.

2. The closed porous composite material according to claim 1 consisting of the plurality of closed cavities, each enclosed by one of the plurality of polymer walls.

3. The closed porous composite material according to claim 1, wherein a thickness of each polymer wall is from 0.02 μm to 2 μm.

4. The closed porous composite material according to claim 1, wherein the plurality of closed cavities have shapes selected from spherical, quasi spherical, and irregular shapes.

5. The closed porous composite material according to claim 1, wherein the plurality of closed cavities are formed by expanding a diameter of thermo-expandable microspheres by 2-10 times.

6. The closed porous composite material according to claim 1, wherein the closed porous composite material has a thickness of 0.2 mm-3.0 mm and a clo value of from 0.1 to 3.0.

7. The closed porous composite material according to claim 1, wherein each polymer wall has a three-layered structure that comprises two outer layers and an intermediate layer sandwiched between the two outer layers, wherein materials of the two outer layers are the same, and materials of the two outer layers are different from the material of the intermediate layer sandwiched between the two outer layers.

8. The closed porous composite material according to claim 1, wherein, the thermal conductivity of the closed porous composite material is less than 0.025 w/m·k.

9. The closed porous composite material according to claim 1, wherein the size range of the closed cavities is from 80 μm to 120 μm.

10. The closed porous composite material according to claim 1, wherein, the thickness of the polymer walls is from 0.1 μm to 0.5 μm.

* * * * *